US012686028B2

(12) United States Patent
Martensson

(10) Patent No.: US 12,686,028 B2
(45) Date of Patent: Jul. 21, 2026

(54) JETTING DEVICES WITH SUPPLY CONDUIT ACTUATOR

(71) Applicant: Mycronic AB, Taby (SE)

(72) Inventor: Gustaf Martensson, Solna (SE)

(73) Assignee: Mycronic AB, Taby (SE)

( * ) Notice: Subject to any disclaimer, the term of this patent is extended or adjusted under 35 U.S.C. 154(b) by 958 days.

(21) Appl. No.: 17/781,094

(22) PCT Filed: Jan. 28, 2021

(86) PCT No.: PCT/EP2021/051913
§ 371 (c)(1),
(2) Date: May 31, 2022

(87) PCT Pub. No.: WO2021/151973
PCT Pub. Date: Aug. 5, 2021

(65) Prior Publication Data

US 2023/0001443 A1 Jan. 5, 2023

(30) Foreign Application Priority Data

Jan. 28, 2020 (SE) .................................... 2050073-2

(51) Int. Cl.
*B05C 11/10* (2006.01)
*B05C 5/02* (2006.01)

(52) U.S. Cl.
CPC ........ *B05C 11/1034* (2013.01); *B05C 5/0225* (2013.01)

(58) Field of Classification Search
CPC .......................... B05C 11/1034; B05C 5/0225
See application file for complete search history.

(56) References Cited

U.S. PATENT DOCUMENTS 5,880,759 A * 3/1999 Silverbrook ......... B41J 2/14451 347/51
6,267,266 B1 7/2001 Smith et al.
(Continued)

FOREIGN PATENT DOCUMENTS

CN 1835804 A 9/2006
CN 1849486 A 10/2006
(Continued)

OTHER PUBLICATIONS

International Search Report PCT/ISA/210 for International Application No. PCT/EP2021/051913 dated Nov. 5, 2021.
(Continued)

*Primary Examiner* — Donnell A Long
(74) *Attorney, Agent, or Firm* — Harness, Dickey & Pierce, P.L.C.

(57) ABSTRACT

A device configured to jet one or more droplets of a viscous medium includes a housing at least partially defining a jetting chamber, a supply conduit that supplies the viscous medium into the jetting chamber, a jetting nozzle, an impacting device configured to force the one or more droplets of the viscous medium through the conduit of the jetting nozzle to be jetted as the one or more droplets, and a supply conduit actuator configured to adjust a hydrodynamic resistance of at least a portion of the supply conduit to viscous medium flow from the jetting chamber via the supply conduit, based on moving through the portion of the supply conduit, independently of the impacting device, to adjust a cross-sectional flow area of the portion of the supply conduit.

17 Claims, 9 Drawing Sheets

(56) References Cited

U.S. PATENT DOCUMENTS

| | | | | |
|---|---|---|---|---|
| 6,416,678 | B1 * | 7/2002 | Hadimioglu | B41J 2/14008 216/49 |
| 6,464,337 | B2 * | 10/2002 | Roy | B41J 2/04 347/18 |
| 6,474,786 | B2 * | 11/2002 | Percin | B41J 2/04 347/54 |
| 7,694,857 | B1 | 4/2010 | Fugere | |
| 10,609,822 | B1 * | 3/2020 | Brevemark | B05B 15/55 |
| 2002/0101478 | A1 * | 8/2002 | Roy | B41J 2/04 347/46 |
| 2003/0020788 | A1 * | 1/2003 | Asano | B41J 2/175 347/85 |
| 2012/0085842 | A1 | 4/2012 | Ciardella et al. | |

FOREIGN PATENT DOCUMENTS

| | | | |
|---|---|---|---|
| CN | 101081562 | A | 12/2007 |
| CN | 102950071 | A | 3/2013 |
| CN | 103097681 | A | 5/2013 |
| CN | 103464342 | A | 12/2013 |
| CN | 108973331 | A | 12/2018 |
| EP | 3381701 | A1 | 10/2018 |
| JP | 2009-143126 | A | 7/2009 |
| WO | WO-2019-011674 | A1 | 1/2019 |

OTHER PUBLICATIONS

Chinese Office Action dated Jun. 22, 2024 issued in corresponding Chinese Appln. No. 202180008380.1 (with English translation).

Chinese Office Action dated Oct. 13, 2024 issued in corresponding Chinese Appln. No. 202180008380.1 (with English translation).

* cited by examiner

JETTING DEVICES WITH SUPPLY CONDUIT ACTUATOR

CROSS-REFERENCE TO RELATED APPLICATIONS

This application is a national phase under 35 U.S.C. § 371 of PCT International Application No. PCT/EP2021/051913 which has an International filing date of Jan. 28, 2021, which claims priority to SE Application No. 2050073-2, filed Jan. 28, 2020, the entire contents of each of which are hereby incorporated by reference.

BACKGROUND

Technical Field

Example embodiments described herein generally relate to the field of "jetting" droplets of a viscous medium onto a substrate. More specifically, the example embodiments relate to improving the performance of a jetting device, and a jetting device configured to "jet" droplets of viscous medium onto a substrate.

Related Art

Jetting devices are known and are primarily intended to be used for, and may be configured to implement, jetting droplets of viscous medium, e.g. solder paste or glue, onto a substrate, prior to mounting of components thereon.

A jetting device (also referred to herein as simply a "device") may include a nozzle space (also referred to herein as a jetting chamber) configured to contain a relatively small volume ("amount") of viscous medium prior to jetting, a jetting nozzle (also referred to herein as an eject nozzle) coupled to (e.g., in communication with) the nozzle space, an impacting device configured to impact and jet the viscous medium from the nozzle space through the jetting nozzle in the form of droplets, and a feeder configured to feed the medium into the nozzle space.

In some cases, good and reliable performance of the device may be a relatively important factor in the implementation of the above two measures, as well as a high degree of accuracy and a maintained high level of reproducibility during an extended period of time. In some cases, absence of such factors may lead to unintended variation in deposits on workpieces, (e.g., circuit boards), which may lead to the presence of errors in such workpieces. Such errors may reduce reliability of such workpieces. For example, unintended variation in one or more of deposit size, deposit placement, deposit shape, etc. on a workpiece that is a circuit board may render the circuit board more vulnerable to bridging, short circuiting, etc.

In some cases, good and reliable control of droplet size may be a relatively important factor in the implementation of the above two measures. In some cases, absence of such control may lead to unintended variation in deposits on workpieces, (e.g., circuit boards), which may lead to the presence of errors in such workpieces. Such errors may reduce reliability of such workpieces. For example, unintended variation in one or more of deposit size, deposit placement, deposit shape, etc. on a workpiece that is a circuit board may render the circuit board more vulnerable to bridging, short circuiting, etc.

SUMMARY

According to some example embodiments, a device configured to jet one or more droplets of a viscous medium may include a housing having an inner surface at least partially defining a jetting chamber configured to hold the viscous medium, a supply conduit in fluid communication with the jetting chamber, a jetting nozzle having a conduit in fluid communication with the jetting chamber, an impacting device including an impact end surface at least partially defining the jetting chamber, and a supply conduit actuator configured to adjust a hydrodynamic resistance of at least a portion of the supply conduit to viscous medium flow from the jetting chamber via the supply conduit, based on moving through the portion of the supply conduit, independently of the impacting device, to adjust a cross-sectional flow area of the portion of the supply conduit. The supply conduit may be configured to supply the viscous medium into the jetting chamber. The impacting device may be configured to cause an increase of internal pressure of viscous medium in the jetting chamber by moving through at least a portion of a space defined by one or more inner surfaces of the housing to reduce a volume of the jetting chamber, to force the one or more droplets of the viscous medium through the conduit of the jetting nozzle to be jetted as the one or more droplets.

The impacting device may include a piezoelectric actuator.

The supply conduit actuator may include a piezoelectric actuator.

The supply conduit actuator may be configured to, at a full extension of the supply conduit actuator, reduce the cross-sectional flow area of the portion of the supply conduit without closing the cross-sectional flow area of the portion of the supply conduit.

The supply conduit actuator may be coupled to the supply conduit at an outlet orifice of the supply conduit that is in the one or more inner surfaces of the housing that at least partially define the jetting chamber.

The device may further include a sensor device configured to monitor the one or more droplets and generate sensor data based on the monitoring, such that the sensor data indicates a value of one or more properties of the one or more droplets. The device may further include a control device configured to receive and process the sensor data to determine the value of the one or more properties of the one or more droplets, and adjustably control the hydrodynamic resistance of the portion of the supply conduit, via adjustably controlling movement of the supply conduit actuator, in response to determining that a difference between a value of the one or more properties and a corresponding target value of the one or more properties at least meet one or more corresponding threshold droplet property values.

The control device may be configured to control the supply conduit actuator to determine a difference between the one or more properties and a target value of the one or more properties, and control the hydrodynamic resistance of the portion of the supply conduit to a new hydrodynamic resistance, via adjustably controlling movement of the supply conduit actuator, in response to determining that the difference at least meets a threshold value.

The one or more properties of the one or more droplets may include at least one of a velocity of the one or more droplets, a diameter of the one or more droplets, or a volume of the one or more droplets.

The control device may be configured to control the impacting device and the supply conduit actuator to cause the supply conduit actuator to increase the hydrodynamic resistance of the portion of the supply conduit from a first magnitude to a second magnitude, and subsequently cause the impacting device to cause the one or more droplets to be jetted while the hydrodynamic resistance is maintained at the second magnitude.

The control device may be configured to control the impacting device and the supply conduit actuator to cause the supply conduit actuator to reduce the hydrodynamic resistance of the portion of the supply conduit from the second magnitude to the first magnitude, upon an elapse of a rest period subsequently to the one or more droplets being jetted.

According to some example embodiments, a method of controlling a device configured to jet one or more droplets of viscous medium onto a substrate may be provided. The device may include a housing having an inner surface at least partially defining a jetting chamber configured to hold the viscous medium, a supply conduit in fluid communication with the jetting chamber, the supply conduit configured to supply the viscous medium into the jetting chamber, a jetting nozzle having a conduit in fluid communication with the jetting chamber, and an impacting device including an impact end surface at least partially defining the jetting chamber, the impacting device configured to cause an increase of internal pressure of viscous medium in the jetting chamber by moving through at least a portion of a space defined by one or more inner surfaces of the housing to reduce a volume of the jetting chamber, to force the one or more droplets of the viscous medium through the conduit of the jetting nozzle to be jetted as the one or more droplets. The method may include controlling a supply conduit actuator to adjust a hydrodynamic resistance of at least a portion of the supply conduit to viscous medium flow from the jetting chamber via the supply conduit, based on causing the supply conduit actuator to move through the portion of the supply conduit, independently of the impacting device, to adjust a cross-sectional flow area of the portion of the supply conduit.

The controlling may cause the supply conduit actuator to move to a full extension position to reduce the cross-sectional flow area of the portion of the supply conduit without closing the cross-sectional flow area of the portion of the supply conduit.

The method may further include processing sensor data received from a sensor device, the sensor data generated based on the sensor device monitoring the one or more droplets, to determine one or more properties of the one or more droplets, and adjustably controlling the hydrodynamic resistance of the portion of the supply conduit, via adjustably controlling movement of the supply conduit actuator, based on the determined one or more properties.

The adjustably controlling may include determining a difference between the one or more properties and a target value of the one or more properties, and controlling the hydrodynamic resistance of the portion of the supply conduit to a new hydrodynamic resistance, via adjustably controlling movement of the supply conduit actuator, in response to determining that the difference at least meets a threshold value.

The one or more properties of the one or more droplets may include at least one of a velocity of the one or more droplets, a diameter of the one or more droplets, or a volume of the one or more droplets.

The controlling may cause the supply conduit actuator to increase the hydrodynamic resistance of the portion of the supply conduit from a first magnitude to a second magnitude, and the method may further include subsequently causing the impacting device to cause the one or more droplets to be jetted while the hydrodynamic resistance is maintained at the second magnitude.

The method may further include causing the supply conduit actuator to reduce the hydrodynamic resistance of the portion of the supply conduit from the second magnitude to the first magnitude, upon an elapse of a rest period subsequently to the one or more droplets being jetted.

The impacting device may include a piezoelectric actuator.

The supply conduit actuator may include a piezoelectric actuator.

BRIEF DESCRIPTION OF THE DRAWINGS

Some example embodiments will be described with regard to the drawings. The drawings described herein are for illustration purposes only and are not intended to limit the scope of the present disclosure in any way.

DETAILED DESCRIPTION

Figure 1:
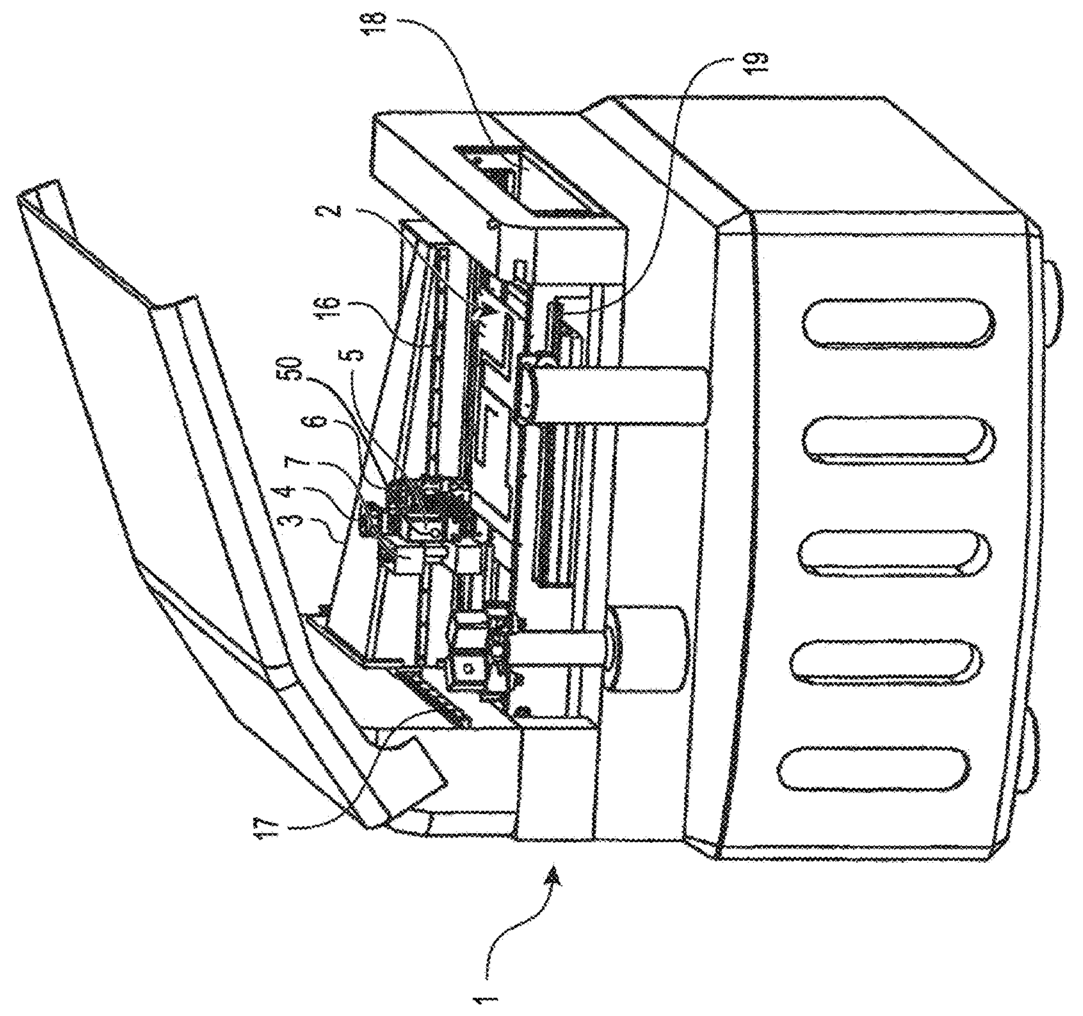
FIG. 1 is a perspective view illustrating a jetting device according to some example embodiments of the technology disclosed herein.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only the example embodiments set forth herein.

It should be understood that there is no intent to limit example embodiments to the particular ones disclosed, but on the contrary example embodiments are to cover all modifications, equivalents, and alternatives falling within the appropriate scope. Like numbers refer to like elements throughout the description of the figures.

Example embodiments of the technology disclosed herein are provided so that this disclosure will be thorough, and will fully convey the scope to those who are skilled in the art. Numerous specific details are set forth such as examples of specific components, devices, and methods, to provide a thorough understanding of implementations of the technology disclosed herein. It will be apparent to those skilled in the art that specific details need not be employed, that example embodiments of the technology disclosed herein may be embodied in many different forms and that neither should be construed to limit the scope of the disclosure. In some example embodiments of the technology disclosed herein, well-known processes, well-known device structures, and well-known technologies are not described in detail.

The terminology used herein is for the purpose of describing particular example embodiments of the technology disclosed herein only and is not intended to be limiting. As used herein, the singular forms "a", "an" and "the" may be intended to include the plural forms as well, unless the context clearly indicates otherwise. The terms "comprises," "comprising," "includes," "including," "has," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, regions, layers and/or sections should not be limited by these terms. These terms may be only used to distinguish one element, component, region, layer and/or section from another region, layer and/or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments of the technology disclosed herein.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

When the words "about" and "substantially" are used in this specification in connection with a numerical value, it is intended that the associated numerical value include a tolerance of ±10% around the stated numerical value, unless otherwise explicitly defined.

In the context of the present application, it is to be noted that the term "viscous medium" should be understood as highly viscous medium with a viscosity (e.g., dynamic viscosity) typically about or above 1 Pa s (e.g., solder paste, solder flux, adhesive, conductive adhesive, or any other kind of medium of fluid used for fastening components on a substrate, conductive ink, resistive paste, or the like, all typically with a viscosity about or above 1 Pa s). The terms "jetted droplet," "droplet," or "shot" should be understood as the volume of the viscous medium that is forced through the jetting nozzle and moving towards the substrate in response to an impact of the impacting device.

In the context of the present application, it is noted that the term "jetting" should be interpreted as a non-contact deposition process that utilizes a fluid jet to form and shoot droplets of a viscous medium from a jetting nozzle onto a substrate, as compared to a contact dispensing process, such as "fluid wetting". In contrast to a dispenser and dispensing process where a needle in combination with, for contact dispensing, the gravitation force and adhesion force with respect to the surface is used to dispense viscous medium on a surface, an ejector or jetting head assembly for jetting or shooting viscous medium should be interpreted as an apparatus including an impacting device, such as an impacting device including, for example, a piezoelectric actuator and a plunger, for rapidly building up pressure in a jetting chamber by the rapid movement (e.g., rapid controlled mechanical movement) of an impacting device (e.g., the rapid movement of a plunger) over a period of time that is more than about 1 microseconds, but less than about 50 microseconds, thereby providing a deformation of the fluid in the chamber that forces droplets of viscous medium through a jetting nozzle. In one implementation, an ejection control unit applies a drive voltage intermittently to a piezoelectric actuator, thereby causing an intermittent extension thereof, and a reciprocating movement of a plunger with respect to the assembly housing of the ejector or jetting head assembly head.

"Jetting" of viscous medium should be interpreted as a process for ejecting or shooting droplets of viscous medium where the jetting of droplets of the viscous medium onto a surface is performed while the at least one jetting nozzle is in motion without stopping at each location on the workpiece where viscous medium is to be deposited. Jetting of viscous medium should be interpreted as a process for ejecting or shooting droplets of viscous medium where the ejection of a droplet through a nozzle is controlled by an impacting device building up a rapid pressure impulse in a jetting chamber over a time period that typically is more than about 1 microseconds and less than about 50 microseconds. For the movement of the impacting device to be rapid enough to build up a pressure impulse in the jetting chamber to force individual droplets or shots of the relatively highly viscous fluids (with a viscosity of about or above 1 Pa s) out of the chamber through the jetting nozzle, the break-off is induced by the impulse of the shot itself and not by gravity or the movement of a needle in an opposite direction. A volume of each individual droplet to be jetted onto the workpiece may be between about 100 pL and about 30 nL. A dot diameter for each individual droplet may be between about 0.1 mm and about 1.0 mm. The speed of the jetting, i.e. the speed of each individual droplet, may be between about 5 m/s and about 50 m/s. The speed of the jetting mechanism, e.g. the impacting mechanism for impacting the jetting nozzle, may be as high as between about 5 m/s and about 50 m/s but is typically smaller than the speed of the jetting, e.g. between about 1 m/s and about 30 m/s, and depends on the transfer of momentum through the nozzle.

The terms "jetting" and "jetting head assembly" in this disclosure and the claims, refer to the break-off of a fluid filament induced by the motion of the fluid element in contrast to a slower natural break-off akin to dripping where the a break-off of a fluid filament is driven for example by gravity or capillary forces.

In order to distinguish "jetting" of droplets of a viscous medium using a "jetting head assembly" such as an ejector-based non-contact jetting technology from the slower natural dripping break-off driven by gravity or capillary forces, we introduce below non-dimensional numbers that describe a threshold for the dripping-jetting transition for filament break-off for different cases and fluids that are driven by different physical mechanisms.

For elastic fluids, the terms "jetting" and "jetting head assembly" refer to the definition of jetting droplets by reference to the Weissenberg number, $Wi=\lambda U_{jet}/R$, where $\lambda$ is the dominant relaxation time of the fluid, $U_{jet}$ is the speed of the fluid and R is the radius of the jet, can be used and the threshold for dripping-jetting is approximately $20<Wi_{th}<40$.

For fluids where break-off is controlled by viscous thinning, the terms "jetting" and "jetting head assembly" refer to the definition of jetting droplets by reference to the Capillary number, described by $Ca=\eta_0 U_{jet}/\gamma$, where $\eta_0$ is the yield viscosity and $\gamma$ is the surface tension, can be used to introduce a threshold for dripping-jetting of $Ca_{th}\approx 10$.

For fluids where break-off is dominated by inertial dynamics, the terms "jetting" and "jetting head assembly" refer to the definition of jetting droplets by reference to the Weber number, expressed as $\rho U^2 jetR/\gamma$, where $\rho$ is the fluid density, can be used to introduce a jetting-dripping threshold of $We_{th}\approx 1$.

The ability to eject a more precise and/or accurate volume of viscous medium from a given distance at a specific position on a workpiece while in motion are hallmarks of viscous jetting. These characteristics allow the application of relatively highly viscous fluids (e.g., above 1 Pa s) while compensating for a considerable height variation on the workpiece (h=about 0.4 to about 4 mm). The volumes are relatively large compared to ink jet technology (between about 100 pL and about 30 nL) as are the viscosities (viscosities of about or above 1 Pa s).

At least some example implementations of the technology disclosed provide increased speed of application due to the jetting "on the fly" principle of ejector-based jetting technology applying viscous medium without stopping for each location on the workpiece where viscous medium is to be deposited. Hence, the ability of ejector-based jetting technology of jetting droplets of the viscous medium onto a first (horizontal) surface is performed while the at least one jetting nozzle is in motion without stopping at each location provides an advantage in terms of time savings over capillary needle dispensing technology.

Typically, an ejector is software controlled. The software needs instructions for how to apply the viscous medium to a specific substrate or according to a given (or alternatively, desired or predetermined) jetting schedule or jetting process. These instructions are called a "jetting program". Thus, the jetting program supports the process of jetting droplets of viscous medium onto the substrate, which process also may be referred to as "jetting operation". The jetting program may be generated by a pre-processing step performed off-line, prior to the jetting operation.

As discussed herein, "viscous medium" may be solder paste, flux, adhesive, conductive adhesive, or any other kind ("type") of medium used for fastening components on a substrate, conductive ink, resistive paste, or the like. However, example embodiments of the technology disclosed herein should not be limited to only these examples.

A "substrate" may be a "workpiece." A workpiece may be any carrier, including any carrier of electronic components. A workpiece may include, but is not limited to, a piece of glass, a piece of silicon, a piece of one or more organic material-based substrates, a printed circuit board, a piece of plastic paper, any combination thereof, or any other type of carrier material. A workpiece may be a board (e.g., a printed circuit board (PCB) and/or a flexible PCB), a substrate for ball grid arrays (BGA), chip scale packages (CSP), quad flat packages (QFP), wafers, flip-chips, or the like.

It is also to be noted that the term "jetting" should be interpreted as a non-contact dispensing process that utilizes a fluid jet to form and shoot one or more droplets of a viscous medium from a jet nozzle onto a substrate, as compared to a contact dispensing process, such as "fluid wetting." It is also to be noted that the term "jetting," and any "jetting operation" as described herein, may include the incremental jetting of one or more droplets to incrementally form one or more deposits on a substrate. But it will also be understood that the term "jetting," and any "jetting operation" as described herein, is not limited to the incremental jetting of one or more droplets to incrementally form one or more deposits on a substrate. For example, the term "jetting," and any "jetting operation" as described herein, may encompass a "screen printing" operation, as the term is well-known, for example where a viscous medium is transferred to a substrate so that multiple deposits are formed on a substrate simultaneously or substantially simultaneously (e.g., simultaneously within manufacturing tolerances and/or material tolerances).

The term "deposit" may refer to a connected amount of viscous medium applied at a position on a workpiece as a result of one or more jetted droplets.

For some example embodiments, the solder paste may include between about 40% and about 60% by volume of solder balls and the rest of the volume may be solder flux.

In some example embodiments, the volume percent of solder balls of average size may be in the range of between about 5% and about 40% of the entire volume of solid phase material within the solder paste. In some example embodiments, the average diameter of the first fraction of solder balls may be within the range of between about 2 and about 5 microns, while the average diameter of a second fraction of solder balls may be between about 10 and about 30 microns.

The term "deposit size" refers to the area on the workpiece, such as a substrate, that a deposit will cover. An increase in the droplet volume generally results in an increase in the deposit height as well as the deposit size.

In some example embodiments, a jetting device may include a jetting chamber communicating with a supply of viscous medium, and a nozzle ("jetting nozzle") communicating with the jetting chamber. The jetting chamber may be at least partially defined by one or more inner surfaces of a housing of the jetting device and one or more surfaces of the jetting nozzle. One or more surfaces of the impacting device, including an impact end surface, may be understood to at least partially define the jetting chamber. Prior to the jetting of a droplet, the jetting chamber may be supplied with viscous medium from the supply of viscous medium. Then, the volume of the jetting chamber may be rapidly reduced (e.g., based on movement of the impacting device through a portion of the housing), causing a well-defined volume and/or mass ("amount") of viscous medium to be forced with high velocity out of the orifice or exit hole ("outlet orifice") of the jetting nozzle and onto a substrate, thus forming a deposit or dot of viscous medium on the substrate. The jetted amount (e.g., the amount of viscous medium that is forced through the outlet orifice and thus out of the jetting device) is hereinafter referred to as a droplet or a jet.

In some example embodiments, the jetting device includes a supply conduit actuator that is configured to move, independently of the impacting device, through at least a portion of the supply conduit, so as to adjust a cross-sectional flow area of the portion of the supply conduit. The hydrodynamic resistance of at least the portion of the supply conduit, and in some example embodiments the jetting device in general, is adjusted based on the adjustment of the cross-sectional flow area of the portion of the supply conduit. For example, the hydrodynamic resistance, of at least the portion of the supply conduit through which the supply conduit actuator moves, to flow of viscous medium therethrough, may be controlled and/or increased prior to, during, and subsequently to a portion of a jetting operation wherein the impacting device causes one or more droplets to be jetted from the jetting chamber via the jetting nozzle. As described herein a hydrodynamic resistance of at least a portion of the supply conduit through which the supply conduit actuator moves may be understood to include a hydrodynamic resistance of some or all of the entire supply conduit to viscous flow threrethrough, a hydrodynamic resistance of some or all of the jetting device to viscous flow to or from the jetting chamber and/or jetting nozzle via the supply conduit, a general hydrodynamic resistance of some or all of the jetting device, any combination thereof, or the like. As referred to herein, a viscous medium flow, through at least the portion of the supply conduit through which the supply conduit actuator may move, may include a "forward" flow of viscous medium into the jetting chamber via the supply conduit and/or a "backflow" of viscous medium from the jetting chamber and/or the jetting nozzle via the supply conduit (i.e., a flow from the jetting chamber via the supply conduit thereby being a flow that does not pass from the jetting chamber to the jetting nozzle), referred to herein as "backflow" of viscous medium from the jetting chamber.

In some example embodiments, the supply conduit actuator may be controlled to increase the cross-sectional flow area of the portion of the supply conduit between separate jetting operations, to enable viscous medium flow to the jetting chamber via the supply conduit with a lower hydrodynamic resistance of the supply conduit, to replace ("replenish"), in the jetting chamber, the volume of viscous medium that is jetted as the one or more droplets during each jetting operation.

It will be understood that the supply conduit actuator may "move" through a portion of the supply conduit by at least partially "extending" through at least some of the portion of the supply conduit to thus adjust a cross-sectional flow area of the portion of the supply conduit. It will be understood that moving through the portion of the supply conduit may include moving through a limited section of the portion of the supply conduit, such that the cross-sectional flow area of the portion of the supply conduit is changed between two separate values but is not completely closed (e.g., reduced to zero value, or null size, such that the cross-sectional flow area is completely occluded).

As a result of independently controlling the hydrodynamic resistance of at least the portion of the supply conduit through which the supply conduit actuator may move, via controlling the cross-sectional flow area of the portion of the supply conduit via movement of the supply conduit actuator, and separately causing droplets to be jetted via independent control of the impacting device, backflow of viscous medium from the jetting chamber via the supply conduit during the jetting operation may be reduced or minimized, and the properties of droplets jetted during the jetting operation may be more precisely controlled and may be more uniform ("consistent") from droplet to droplet, so that the droplets have properties that are more consistent and are more accurate with regard one or more target values of the properties. As a result, the reliability and performance of the jetting device may be improved, and thus the reliability and performance of workpieces formed based on the jetting device jetting the one or more droplets on a substrate may be improved.

In some example embodiments, the control of the hydrodynamic resistance via operation (also referred to herein as control and/or adjusting) of the supply conduit actuator may be further based upon sensor data generated by one or more sensor devices monitoring the one or more jetted droplets and/or one or more deposits formed on a substrate as a result of one or more jetted droplets reaching the substrate, so that the hydrodynamic resistance may be adjusted, in a single operation or iteratively after successive jetting operations, to adjust the properties of the jetted droplets to approach or reach one or more target properties based on adjusting the range of movement of the supply conduit actuator during a jetting operation and thus adjusting the restriction of the cross-sectional flow area of at least the portion of the supply conduit through which the supply conduit actuator moves.

FIG. 1 is a perspective view illustrating a jetting device 1 according to some example embodiments of the technology disclosed herein.

The jetting device 1 may be configured to dispense ("jet") one or more droplets of a viscous medium onto a substrate (e.g., board 2, which may be a "workpiece") to generate ("establish," "form," "provide," etc.) a board 2 having one or more deposits therein. The above "dispensing" process performed by the jetting device 1 may be referred to as "jetting."

For ease of description, the substrate may be referred to herein as an electric circuit board and the gas may be referred to herein as air.

In some example embodiments, including the example embodiments illustrated in FIG. 1, the jetting device 1 includes an X-beam 3 and an X-wagon 4. The X-wagon 4 may be connected to the X-beam 3 via an X-rail 16 and may be reciprocatingly movable (e.g., configured to be moved reciprocatingly) along the X-rail 16. The X-beam 3 may be reciprocatingly movably connected to a Y-rail 17, the X-beam 3 thereby being movable (e.g., configured to be moved) perpendicularly to the X-rail 16. The Y-rail 17 may be rigidly mounted in the jetting device 1. Generally, the above-described movable elements may be configured to be moved based on operation of one or more linear motors (not shown) that may be included in the jetting device 1.

In some example embodiments, including the example embodiments illustrated in FIG. 1, the jetting device 1 includes a conveyor 18 configured to carry the board 2 through the jetting device 1, and a locking device 19 for locking the board 2 when jetting is to take place.

A docking device 8 (not visible in FIG. 1, shown in FIG. 2) may be connected to the X-wagon 4 to enable releasable mounting of a jetting head assembly 5 at the docking device 8. The jetting head assembly 5 may be arranged for dispensing droplets of solder paste, i.e. jetting, which impact and form deposits on the board 2. The jetting device 1 also may include a vision device. In some example embodiments, including the example embodiments illustrated in FIG. 1, the vision device is a camera 7. The camera 7 may be used by a control device (not shown in FIG. 1) of the jetting device 1 to determine the position and/or rotation of the board 2 and/or to check the result of the dispensing process by viewing the deposits on the board 2.

Figure 2:
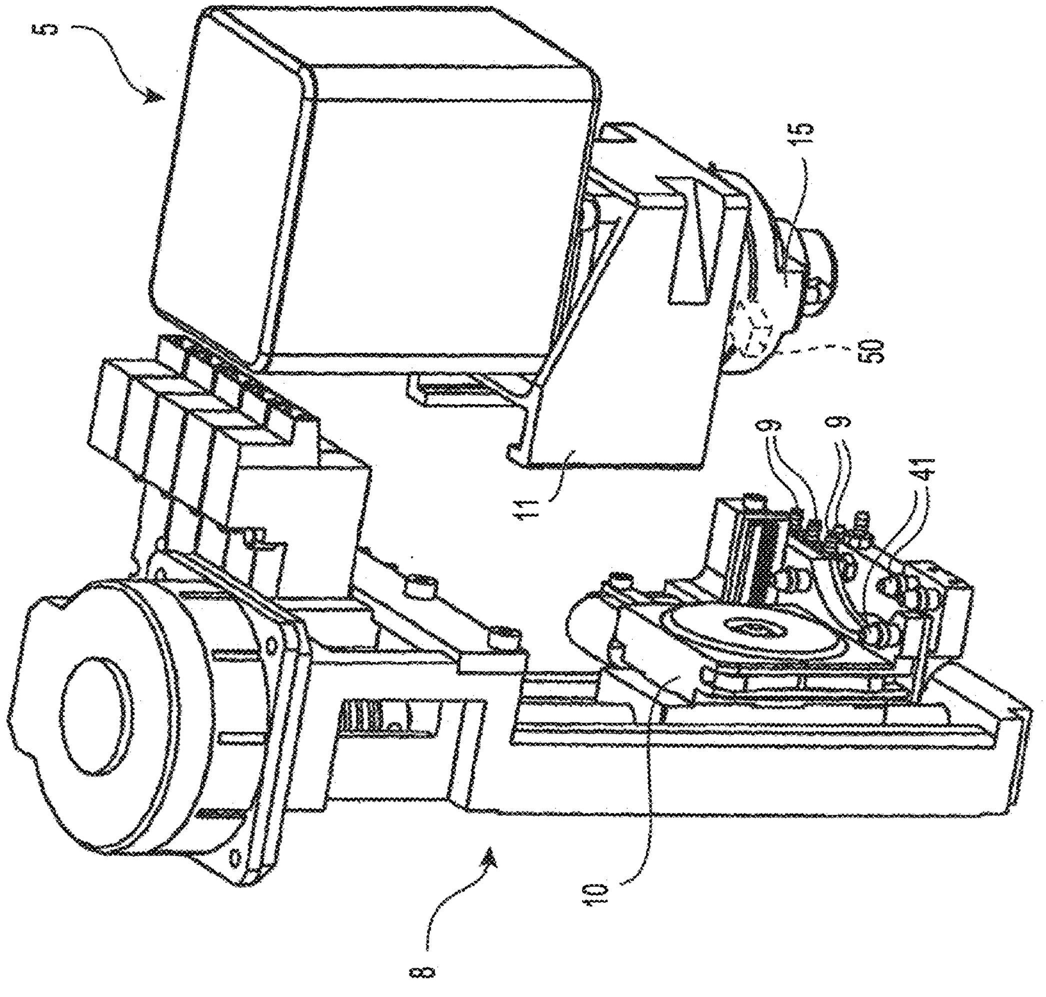
FIG. 2 is a perspective view of a jetting device according to some example embodiments of the technology disclosed herein.

In some example embodiments, including the example embodiments illustrated in FIG. 1, the jetting device 1 includes a flow generator 6. In some example embodiments, including the example embodiments illustrated in FIG. 1, the flow generator 6 is a source of compressed air (e.g., a compressed air tank, a compressor, or the like). The flow generator 6 may be in communication with the docking device 8 via an air conduit interface which may be connectable to a complementary air conduit interface. In some example embodiments, the air conduit interface may include inlet nipples 9 of the docking device 8, as shown in FIG. 2.

As understood by those skilled in the art, the jetting device 1 may include a control device (not explicitly shown in FIG. 1) configured to execute software running the jetting device 1. Such a control device may include a memory storing a program of instructions thereon and a processor configured to execute the program of instructions to operate and/or control one or more portions of the jetting device 1 to perform a "jetting" operation.

In some example embodiments, the jetting device 1 may be configured to operate as follows. The board 2 may be fed into the jetting device 1 via the conveyor 18, upon which the board 2 may be placed. If and/or when the board 2 is in a particular position under the X-wagon 4, the board 2 may be fixed with the aid of the locking device 19. By means of the camera 7, fiducial markers may be located, which markers are prearranged on the surface of the board 2 and used to determine the precise position thereof. Then, by moving the X-wagon over the board 2 according to a particular (or, alternatively, predetermined, pre-programmed, etc.) pattern and operating the jetting head assembly 5 at predetermined locations, solder paste is applied on the board 2 at the desired locations. Such an operation may be at least partially implemented by the control device that controls one or more portions of the jetting device 1 (e.g., locating the fiducial markers via processing images captured by the camera 7, controlling a motor to cause the X-wagon to be moved over the board 2 according to a particular pattern, operating the jetting head assembly 5, etc.).

It will be understood that a jetting device 1 according to some example embodiments may include different combinations of the elements shown in FIG. 1 and may omit some or all elements beyond the jetting head assembly 5 shown in FIG. 1. In some example embodiments, the jetting device 1 may be limited to the jetting head assembly 5.

It will be understood that the jetting device 1 shown in FIG. 1 may include any of the example embodiments of a jetting device described herein. In particular, it will be understood that the jetting device 1 shown in FIG. 1 may include any example embodiment of the supply conduit actuator 50 described herein and shown in other drawings, particularly in example embodiments of the jetting head assembly 5 shown in FIGS. 4-7B. It will be understood that the jetting device shown in FIG. 1 may include a supply conduit actuator 50 as described herein and thus may be configured to adjust a hydrodynamic resistance of at least a portion of the jetting device 1, including a hydrodynamic resistance of at least a portion **37*a* of a supply conduit 31 of the jetting device 1 as described herein, based on moving through the portion of the supply conduit 31 and independently of an impacting device 21 of the jetting device 1 to adjust a cross-sectional flow area of the portion 37*a* of the supply conduit 31**.

Figure 3:
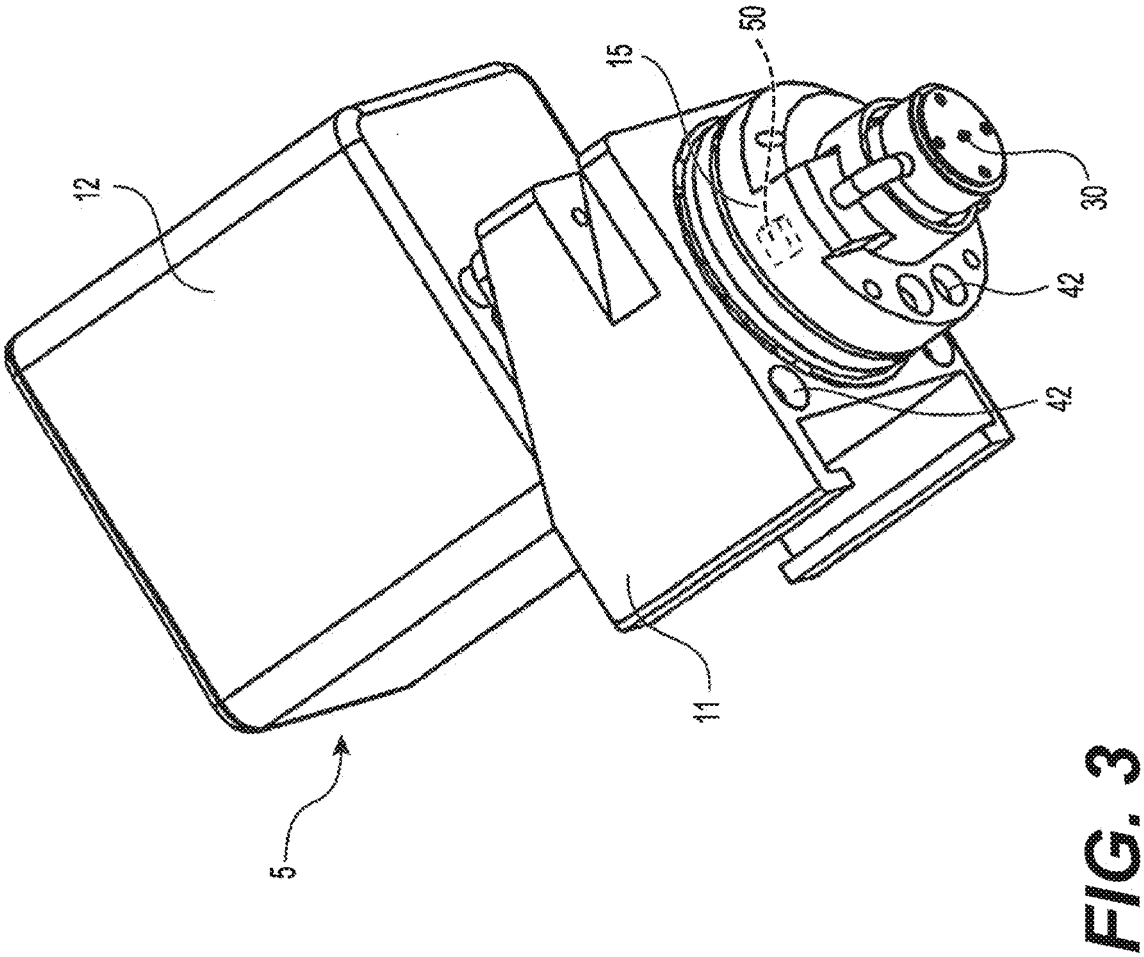
FIG. 3 is a schematic view illustrating a jetting device according to some example embodiments of the technology disclosed herein.

FIG. 2 is a schematic view illustrating a jetting device 1 including a docking device 8 and a jetting head assembly 5 according to some example embodiments of the technology disclosed herein. FIG. 3 is a schematic view illustrating a jetting head assembly 5 according to some example embodiments of the technology disclosed herein. The docking device 8 and jetting head assembly 5 may be included in one or more example embodiments of a jetting device 1, including the jetting device 1 illustrated in FIG. 1.

Referring to FIGS. 2 and 3, the jetting head assembly 5 may include an assembly holder 11, which is configured to connect the jetting head assembly 5 to an assembly support 10 of the docking device 8. The jetting head assembly 5 may include an assembly housing 15. The jetting head assembly 5 may include a supply container 12 configured to provide a supply of viscous medium.

The jetting head assembly 5 may be configured to be connected to a flow generator 6 via a pneumatic interface having inlets 42 positioned to interface in airtight engagement with a complementary pneumatic interface having outlets 41 of the docking device 8. The outlets 41 are connected to inlet nipples 9, which may be coupled to the flow generator 6, via internal conduits of the docking device 8.

The jetting head assembly 5 may be configured to: shoot different types/classes of solder pastes; shoot droplets with different shot sizes/ranges (e.g., overlapping or non-overlapping ranges) and/or shoot droplets of various types of viscous media (solder paste, glue, etc.). Additionally, the jetting head assembly 5 may be used for add-on jetting and/or repair.

It will be understood that, in some example embodiments, a jetting device 1 may be limited to the jetting head assembly 5, for example being limited to the jetting head assembly 5 shown in FIG. 3 and excluding the other portions of the jetting device 1 shown in FIGS. 1-2. It will further be understood that, in some example embodiments, a jetting device 1 may be limited to a limited portion of the jetting head assembly 5, for example some or all of the assembly housing 15 of the jetting head assembly 5. It will be understood that the jetting head assembly shown in FIG. 2 may include a supply conduit actuator 50 as described herein and thus may be configured to adjust a hydrodynamic resistance of at least a portion of the jetting head assembly 5, including a hydrodynamic resistance of at least a portion 37*a* of a supply conduit 31 of the jetting head assembly 5 as described herein, based on moving through the portion 37*a* of the supply conduit 31 and independently of an impacting device 21 of the jetting head assembly 5 to adjust a cross-sectional flow area of the portion 37*a* of the supply conduit 31.

Figure 4:
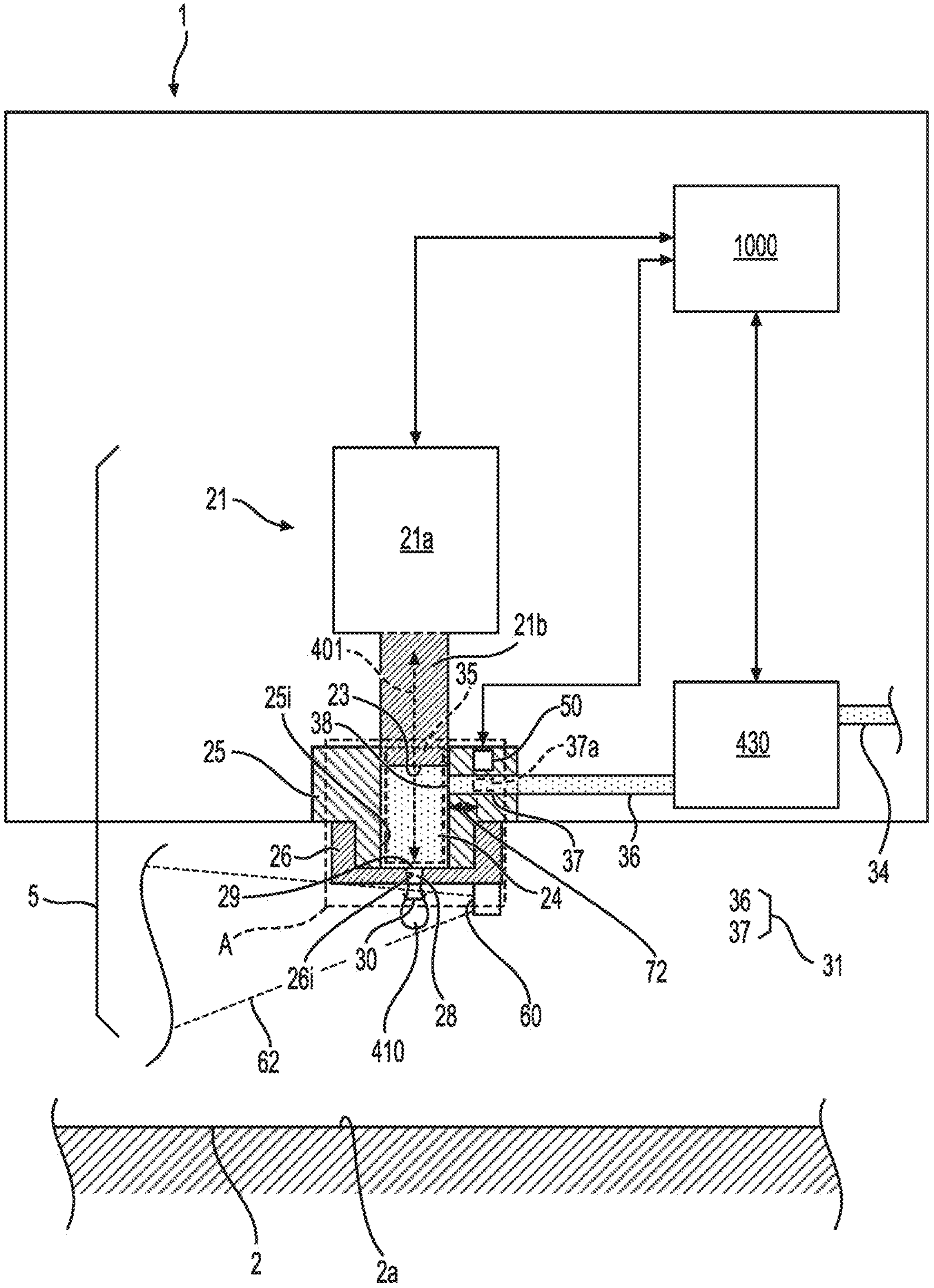
FIG. 4 is a sectional view of a portion of a jetting device according to some example embodiments of the technology disclosed herein.

FIG. 4 is a sectional view of a portion of a jetting device 1 according to some example embodiments of the technology disclosed herein.

With reference now to FIG. 4, the contents and function of the device enclosed in the assembly housing 15 of the jetting head assembly 5 of the jetting device 1 will be explained in greater detail. It will be understood that, in some example embodiments, the jetting device 1 may include some or all of the elements of the jetting head assembly 5, including some or all of the elements of the assembly housing 15.

In some example embodiments, including the example embodiments illustrated in FIG. 4, the jetting head assembly 5, and thus the jetting device 1, may include an impacting device 21. In some example embodiments, including the example embodiments illustrated in FIG. 4, the impacting device 21 may include a piezoelectric actuator having a number ("quantity") of relatively thin, piezoelectric elements stacked together to form an actuator part 21*a* that is a piezoelectric actuator part. As shown in FIG. 4, an upper end of the actuator part 21*a* may be rigidly (e.g., fixedly) connected to the assembly housing 15. The jetting head assembly 5 may further include a bushing 25 (also referred to herein as a "housing") rigidly connected to the assembly housing 15. The impacting device 21 may further include a plunger 21*b*, which is rigidly connected to a lower end of the actuator part 21*a* and is axially movable, along axis 401, while slidably extending (e.g., "moving") through a piston bore 35 in the bushing 25. It will be understood that the piston bore 35 may be referred to as a space (e.g., a fixed-volume space) defined by one or more inner surfaces 25*i* of the bushing 25. It will thus be understood that, based on being configured to move through the piston bore 35 in the bushing 25, the impacting device 21 is configured to move through at least a portion of a space (e.g., a fixed-volume space) defined by one or more inner surfaces 25*i* of the bushing 25. Cup springs (not shown) may be included in the jetting head assembly 5 to resiliently balance the plunger 21*b* against the assembly housing 15, and to provide a preload for the actuator part 21*a*.

While the example embodiments shown in FIG. 4 illustrate the impacting device 21 as being a piezoelectric actuator, such that the actuator part 21*a* is a piezoelectric actuator part, it will be understood that example embodiments are not limited thereto, and the impacting device 21 may be any device configured to implement controllable, repeatable, and precise reciprocating movements through the piston bore 35, such that the actuator part 21*a* may be any such known actuator configured to implement such movement. For example, in some example embodiments, the impacting device 21 may be a reciprocating lever arm connected to plunger 21*b*, a pneumatic actuator device, a combination of one or more piezoelectric and/or pneumatic actuator devices with a fulcrum configuration, any combination thereof, or the like.

In some example embodiments, the jetting device 1 includes a control device 1000. The control device 1000 may be configured (e.g., via programming and being electrically connected to the impacting device 21) to apply a drive voltage intermittently to the impacting device 21, thereby causing an intermittent extension ("movement") of the impacting device 21 and hence a reciprocating movement of the plunger 21*b* with respect to the assembly housing 15, in accordance with solder pattern printing data (e.g., a "jetting program"), for example where the impacting device 21 includes a piezoelectric actuator and the actuator part 21*a* extends (e.g., moves) and causes the plunger 21*b* to move based on the applied drive voltage. Such data may be stored in a memory included in the control device 1000. The drive voltage may be described further herein as including and/or being included in a "control signal," including an "impacting device control signal." It will be understood that an extension of a device through a space, including the extension of the impacting device 21 as described herein, may be referred to herein as the device "moving" through said space.

In some example embodiments, including the example embodiments illustrated in FIG. 4, the jetting device 1 includes a jetting nozzle 26 configured to be operatively directed against (e.g., facing) the board 2, onto which one or more droplets 40 of viscous medium may be jetted. The jetting nozzle 26 may include a conduit 28 that extends through an entire interior (e.g., "thickness") of the jetting nozzle, from an inlet orifice 29 in inner surface 26*a* that at least partially defines the jetting chamber 24, to an outlet orifice 30 (also referred to herein as a "outlet orifice") in an outer surface 26*b* that faces outwards from the assembly housing 15, through which the droplets 40 may be jetted.

In some example embodiments, the plunger 21*b* comprises a piston which is configured to be slidably and axially movably extended, along axis 401, through a piston bore 35, and an end surface ("impact end surface 23") of said piston portion of the plunger 21*b* may be arranged close to said jetting nozzle 26 as a result of said extension/movement.

As shown in FIG. 4, a portion of the piston bore 35 may be a jetting chamber 24, where the jetting chamber 24 is defined by the shape of the impact end surface 23 of said plunger 21*b*, one or more inner surfaces 25*i* of the bushing 25, and the jetting nozzle 26 (e.g., by at least some of the inner surfaces 26*a*. In some example embodiments, the jetting chamber 24 may be defined as a limited portion of the piston bore 35 (e.g., the space defined by the one or more inner surfaces 25*i* of the bushing 25) that is not occupied by the impacting device 21.

As shown in FIG. 4, the jetting conduit 28 is defined by one or more inner surfaces 26*i* of the jetting nozzle and may have a volumetric shape approximating that of a combination of at least a truncated conical space and a cylindrical space. It will be understood that, in some example embodiments, the conduit 28 may have any shape, defined by one or more inner surfaces 26*i* of the jetting nozzle 26, that defines a conduit between the inlet orifice 29, that is open to the jetting chamber 24, and the outlet orifice 30.

Axial movement of the plunger 21*b* towards the jetting nozzle 26 along axis 401, said movement being caused by the intermittent extension of the actuator part 21*a* (e.g., piezoelectric actuator part), said movement involving the plunger 21*b* being received at least partially or entirely into the volume of the piston bore 35, may cause a rapid decrease in the volume of the jetting chamber 24 and thus a rapid pressurization (e.g., increase in internal pressure), and jetting through the outlet orifice 30, of any viscous medium located in the jetting chamber 24 and/or in the conduit 28, including the movement of any viscous medium contained in the jetting chamber 24 out of the jetting chamber 24 and through the conduit 28 to the outlet orifice 30.

Viscous medium may be supplied to the jetting chamber 24 from the supply container 12, see FIG. 2, via a feeding device. The feeding device may be referred to herein as a viscous medium supply 430. The feeding device may be configured to induce a flow of viscous medium (e.g., "solder paste") through one or more conduits to the jetting nozzle 26. The feeding device may include a motor (which is not shown and may be an electric motor) having a motor shaft partly provided in a tubular bore, which extends through the assembly housing 15 to an outlet communicating via a supply conduit 31 with the piston bore 35. As shown, the supply conduit 31 may include a channel 37 that extends through the bushing 25 to the piston bore 35 (and thus the jetting chamber 24) via an outlet orifice 38 and thus is in fluid communication with the jetting chamber 24, and the supply conduit 31 may further include a separate conduit 36, external to the bushing 25, that extends between the channel 37 and the viscous medium supply 430. An end portion of the motor shaft may form a rotatable feed screw which is provided in, and coaxial with, the tubular bore. A portion of the rotatable feed screw may be surrounded by an array of resilient, elastomeric a-rings arranged coaxially therewith in the tubular bore, the threads of the rotatable feed screw making sliding contact with the innermost surface of the a-rings.

The pressurized air obtained at the jetting head assembly 5 from the above-mentioned source of pressurized air (e.g., flow generator 6) may be used by the jetting head assembly 5 to apply a pressure on the viscous medium contained in the supply container 12, thereby feeding said viscous medium to an inlet port 34 communicating with the viscous medium supply 430.

An electronic control signal provided by the control device 1000 of the jetting device 1 to the motor of the feeding device of the viscous medium supply 430 may cause the motor shaft, and thus the rotatable feed screw, to rotate a desired angle, or at a desired rotational speed. Solder paste captured between the threads of the rotatable feed screw and the inner surface of the a-rings may then be caused to travel from the inlet port 34 to the piston bore 35 via the outlet port and the supply conduit 31, in accordance with the rotational movement of the motor shaft. A sealing a-ring may be provided at the top of the piston bore 35 and the bushing 25, such that any viscous medium fed towards the piston bore 35 is prevented from escaping from the piston bore 35 and possibly disturbing the action of the plunger 21*b*.

The viscous medium may then be fed into the jetting chamber 24 via the supply conduit 31. The supply conduit 31 may, as shown in FIG. 4, include a channel 37 that may extend through the bushing 25 to the jetting chamber 24 through an outlet orifice 38 in a sidewall of the jetting chamber 24 (e.g., an inner surface 25*i* of the bushing 25 that at least partially defines the piston bore 35 and thus at least partially defines the jetting chamber 24).

In some example embodiments, the supply conduit 31, including the channel 37, may be distinguished from the jetting chamber 24 based on the jetting chamber 24 being at least partially defined by the impact end surface 23 of the impacting device 21 while the supply conduit 31 is defined by one or more inner surfaces (e.g., inner surface 37*i* of the channel 37) that are independent of any surfaces of the impacting device 21.

As described further below, in some example embodiments, the jetting device 1 is configured to adjust ("control") a hydrodynamic resistance of at least a portion 37*a* of the supply conduit 31, including a hydrodynamic resistance of at least the portion of the supply conduit 31 to a flow of viscous medium 490 from the jetting chamber 24 via the supply conduit 31, based on adjusting a cross-sectional flow area A of the portion 37*a* of the supply conduit 31. The hydrodynamic resistance may be controlled based on causing the hydrodynamic resistance to be reduced between separate jetting operations, to thereby enable improved flow of viscous medium 490 into the jetting chamber 24 from the viscous medium supply 430 via the supply conduit 31, and causing the hydrodynamic resistance to be increased during jetting operations, to thereby reduce or prevent backflow of viscous medium 490 from the jetting chamber 24 and through the supply conduit 31, when the jetting chamber 24 is pressurized based on movement of the impacting device 21 through the piston bore 35 to force one or more droplets 410 of viscous medium 490 through the jetting conduit 28 from the jetting chamber 24. It will be understood that adjusting the hydrodynamic resistance of at least the portion 37*a* of the supply conduit 31 to viscous medium flow may thus adjust the hydrodynamic resistance of some or all of the jetting device 1 to viscous medium flow, for example hydrodynamic resistance to viscous medium flow to or from the jetting chamber 24, via the supply conduit 31 and/or the jetting nozzle 26.

In some example embodiments, as a result of being configured to adjust the hydrodynamic resistance of at least the portion 37*a* of the supply conduit 31, the jetting device 1 may be configured to control a balance of flow of viscous medium toward the jetting chamber 24 and away from the jetting nozzle 26 via the supply conduit 31 in the jetting device 1 during a jetting operation in which the impacting device 21 is moved through the piston bore 35 to force one or more droplets 410 out of the jetting nozzle 26. In some example embodiments, as a result of being configured to adjust the hydrodynamic resistance of at least the portion 37*a* of the supply conduit 31, the jetting device 1 may be configured to apply improved control over one or more properties of the droplets 410 jetted by the jetting device 1, including at least one of volume, shape, or velocity of the jetted droplets 410, based on controlling the hydrodynamic resistance of at least the portion 37*a* of the supply conduit 31 during the jetting operation and/or between jetting operations. As a result, a value of one or more properties of the droplets 410 may be controlled, via control of the hydrodynamic resistance of at least the portion 37*a* of the supply conduit 31, to approach and/or to meet one or more target property values more consistently, thereby providing improved uniformity (and/or reduced unintentional variation) of droplets jetted by the jetting device on a substrate and/or reduced satellite droplet formation. Thus, the jetting device may be configured to provide workpieces having deposits thereon that have improved uniformity and reduced variation and unintended satellite deposits, thereby providing workpieces associated with improved performance and/or reliability.

Still referring to FIG. 4, and further referring to FIGS. 5A-7B, the jetting device 1 may include a supply conduit actuator 50 that is configured to at least partially move (e.g., extend) through the portion 37*a* of the supply conduit 31 to adjust the cross-sectional flow area A of the portion 37*a* of the supply conduit 31 and thus to adjust the hydrodynamic resistance of at least the portion 37*a* of the supply conduit 31.

In some example embodiments, including the example embodiments illustrated in FIG. 4 and FIGS. 5A, 6A, and 7A, the supply conduit actuator 50 may include a piezoelectric actuator having a number ("quantity") of relatively thin, piezoelectric elements stacked together to form an actuator part 50*a* that is a piezoelectric actuator part. As shown in FIG. 4, an upper end of the actuator part 50*a* may be rigidly (e.g., fixedly) connected to the assembly housing 15. The supply conduit actuator 50 may further include a plunger 50*b*, which is rigidly connected to a lower end of the actuator part 50*a* and is axially movable while slidably extending (e.g., "moving") through the portion 37*a* of the supply conduit 31. Cup springs (not shown) may be included in the jetting head assembly 5 to resiliently balance the plunger 50*b* against the assembly housing 15, and to provide a preload for the actuator part 50*a*.

While the example embodiments shown in FIGS. 4-7B illustrate the supply conduit actuator 50 as being at least partially located in the bushing 25 and configured to extend into (e.g., move through) a portion 37*a* of the supply conduit 31 that is in the channel 37, it will be understood that example embodiments are not limited thereto, and the supply conduit actuator 50 may be located entirely external to the bushing 25 and may be configured to extend into a portion of the conduit 36 that is external to the channel 37 (e.g., between the channel 37 and the viscous medium supply 430).

While the example embodiments shown in FIG. 4 illustrate the supply conduit actuator 50 as being a piezoelectric actuator, such that the actuator part 50*a* is a piezoelectric actuator part, it will be understood that example embodiments are not limited thereto, and the supply conduit actuator 50 may be any device configured to implement controllable, repeatable, and precise reciprocating movements through the portion 37*a* of the supply conduit 31, such that the actuator part 50*a* may be any such known actuator configured to implement such movement. For example, in some example embodiments, the supply conduit actuator 50 may be a reciprocating lever arm connected to plunger 50*b*.

In some example embodiments, the control device 1000 may be configured (e.g., via programming and being electrically connected to the supply conduit actuator 50) to apply a drive voltage intermittently to the supply conduit actuator 50, thereby causing an intermittent extension of the supply conduit actuator 50 and hence a reciprocating movement of the plunger 50*b* with respect to the assembly housing 15, in accordance with a jetting operation, for example where the supply conduit actuator 50 includes a piezoelectric actuator and the actuator part 50*a* extends (e.g., moves) and causes the plunger 50*b* to move based on the applied drive voltage. Such data may be stored in a memory included in the control device 1000. The drive voltage may be described further herein as including and/or being included in a "control signal," including a "supply conduit actuator control signal." It will be understood that an extension of a device through a space, including the extension of the supply conduit actuator 50 as described herein, may be referred to herein as the device "moving" through said space.

As shown in FIG. 4, in some example embodiments, the control device 1000 may be communicatively coupled to the impacting device 21 and the supply conduit actuator 50 via separate, independent communication lines, such that the control device 1000 may be configured to control the impacting device 21 and the supply conduit actuator 50 independently from each other and thus be configured to cause the impacting device 21 and the supply conduit actuator 50 to move independently from each other.

Accordingly, the control device 1000 may be configured to control the movement of the supply conduit actuator 50 to control the hydrodynamic resistance of at least the portion 37*a* of the supply conduit 31 and thus to exert control over one or more properties of the droplets 410 that are jetted during a jetting operation, due to control of the impacting device 21 by the control device 1000, based on said control of the hydrodynamic resistance.

Figure 5A:
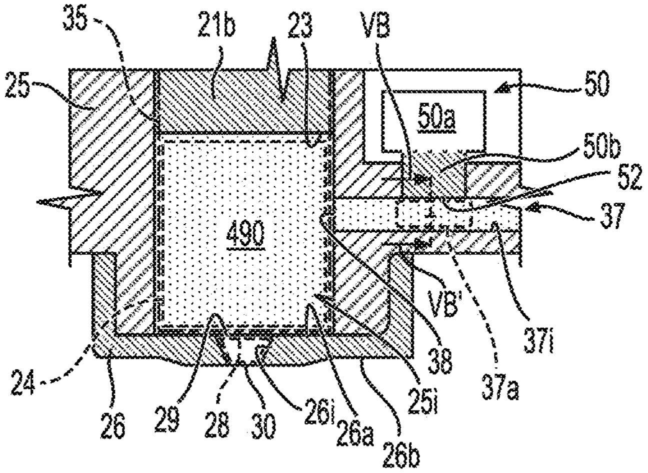
FIGS. 5A, 6A, and 7A are expanded cross-sectional view of region A of the jetting device shown in FIG. 4 at different configurations during a jetting operation according to some example embodiments of the technology disclosed herein.
Figure 6A:
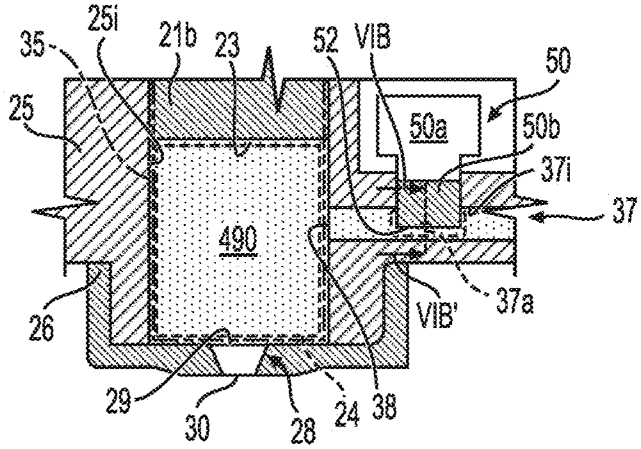
Figure 7A:
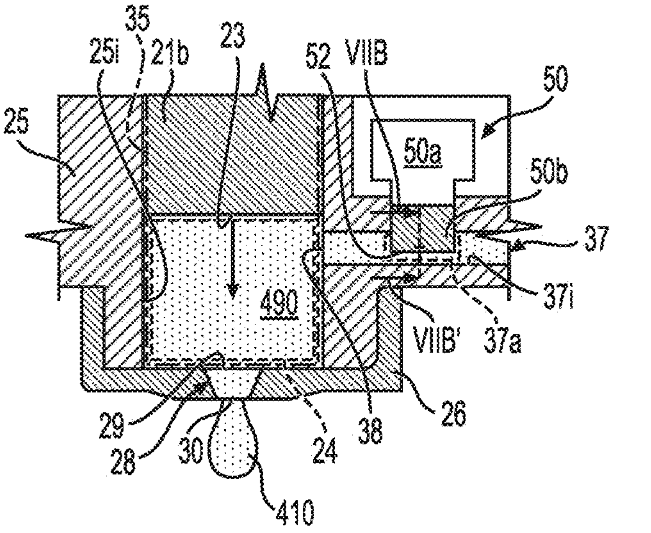

As shown in FIG. 4 and as further shown in FIGS. 5A, 6A, and 7A, the supply conduit actuator 50 may be positioned at a given distance 72 from the supply conduit outlet orifice 38 so as to be configured to move through a portion 37*a* of the supply conduit 31 that is located at the given distance 72 from the outlet orifice 38 of the supply conduit 31. In some example embodiments, the supply conduit actuator 50 may be at the outlet orifice 38 of the supply conduit 31, such that the distance 72 may be a zero value or a null distance, or a relatively small proportion of the length of the channel 37 (e.g., less than about 10% of the length of the channel 37 from the outlet orifice 38 to the exterior of the bushing 25). In some example embodiments, based on being at the outlet orifice 38 and thus being configured to restrict viscous medium flow from the jetting chamber 24 through substantially any portion of the supply conduit 31, the supply conduit actuator 50 may be configured to provide improved control over hydrodynamic resistance to viscous medium flow to and/or from the jetting chamber 24 via the supply conduit 31

Still referring to FIG. 4, a jetting device 1 may include one or more sensor devices 60, also referred to herein as one or more sensors, that are configured to generate sensor data based on monitoring one or more jetted droplets 410, where said sensor data may, when processed (e.g., by the control device 1000), indicate one or more properties of the one or more jetted droplets 410, including at least one of droplet 410 volume, droplet 410 shape, droplet 410 diameter, droplet 410 velocity, any combination thereof, or the like. As shown, a sensor device 60 may be configured to monitor one or more sensor fields 62 and thus may be able to monitor, and generate sensor data based upon, one or more droplets 410 located in and/or passing through said one or more sensor fields 62.

In some example embodiments, the sensor device 60 may be a sensor (e.g., a camera, a light beam scanning device, an ultrasonic sensor, or the like) that is configured to monitor a sensor field 62 that is directed to intersect a direction of flight of jetted droplets 410 prior to said droplets 410 reaching the board 2 and forming one or more deposits thereon. Based on being a sensor that is configured to monitor a sensor field 62, the sensor device 60 may be configured to generate sensor data (e.g., data indicating reflection of a light beam from a droplet 410, data indicating a captured image of a droplet 410, or the like) that may be processed (e.g., by control device 1000) to determine a value (e.g., magnitude) of one or more properties of a droplet 410 that is in flight and within the sensor field 62.

It will be understood that the sensor device 60 may be communicatively coupled with the control device 1000 via one or more communication lines (not shown in FIG. 4), such that the control device 1000 may be configured to receive sensor data generated by the sensor device 60 based on monitoring one or more droplets 410 in the sensor field 62. In some example embodiments, the control device 1000 may be configured to adjust the magnitude ("level") of the reduced hydrodynamic resistance of the portion 37*a* of the supply conduit 31 that is achieved via control of the movement of the supply conduit actuator 50 during a jetting operation, in order to adjust one or more properties of the jetted droplets 410 to reduce a difference between said one or more properties and one or more corresponding target droplet properties, thereby improving performance of the jetting device 1 based on improving and/or optimizing the properties of the jetted droplets 410. Thus, the jetting device 1 may be configured to implement a feedback operation wherein the hydrodynamic resistance of at least the portion 37*a* of the supply conduit 31 during jetting operations may be controllably adjusted in order to controllably adjust one or more properties of the jetted droplets 410.

With reference now to FIGS. 5A-5B, 6A-6B, and 7A-7B, which each show a portion of the jetting head assembly 5 in region A shown in FIG. 4 according to some example embodiments and at different points in a jetting operation, and with further reference to FIG. 8, the contents and function of a jetting device 1 that includes a supply conduit actuator 50 will be explained in greater detail. It will be understood that, while some elements of the jetting head assembly 5 shown in FIG. 4 are not shown in FIGS. 5A-7B, said elements may still be included in example embodiments of the jetting head assembly 5 that have a portion, shown in region A, that corresponds to any of FIGS. 5A-7B.

Figure 5B:
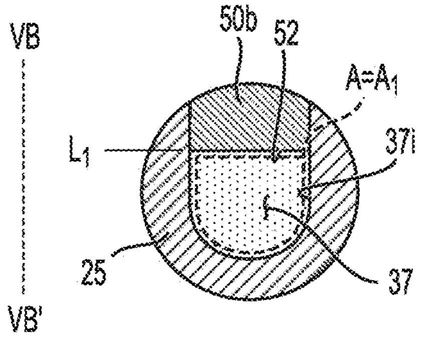
FIGS. 5B, 6B, and 7B are cross-sectional views of the corresponding portions of the jetting device shown in FIGS. 5A, 6A, and 7A along cross-sectional view lines VB-VB', VIB-VIB', and VIIB-VIIB', respectively, according to some example embodiments of the technology disclosed herein.
Figure 6B:
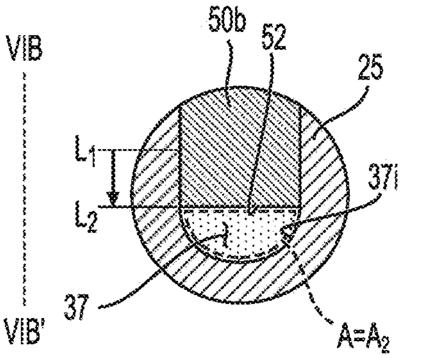
Figure 7B:
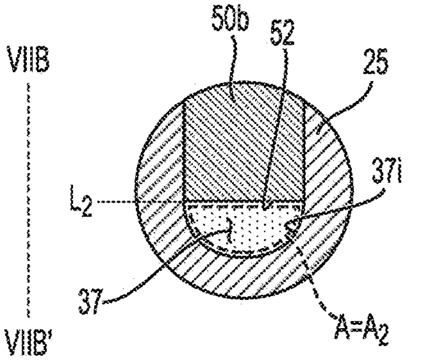

FIGS. 5A, 6A, and 7A are expanded cross-sectional view of region A of the jetting device shown in FIG. 4 at different configurations during a jetting operation according to some example embodiments of the technology disclosed herein. FIGS. 5B, 6B, and 7B are cross-sectional views of the corresponding portions of the jetting device shown in FIGS. 5A, 6A, and 7A along cross-sectional view lines VB-VB', VIB-VIB', and VIIB-VIIB', respectively, according to some example embodiments of the technology disclosed herein. FIG. 8 is a timing chart illustrating variation of motion of the impacting device and supply conduit actuator during a jetting operation according to some example embodiments of the technology disclosed herein.

Referring generally to FIGS. 5A-7B, in some example embodiments, the supply conduit actuator 50 may be configured to adjust a hydrodynamic resistance of at least a portion 37*a* of the supply conduit 31 to viscous medium 490 flow from the jetting chamber 24 via the supply conduit 31, based on moving through at least a part of the portion 37*a* of the supply conduit 31, independently of movement of the impacting device 21, to adjust a cross-sectional flow area A of the portion 37*a* of the supply conduit 31. As described herein, said supply conduit actuator 50 may be controlled by a control device 1000 of the jetting device 1, for example based on one or more control signals transmitted by the control device 1000 to the supply conduit actuator 50 to cause at least an actuator part 50*a* of the supply conduit actuator 50 to move in a controllable manner, based on the control signal (e.g., a drive voltage included in the control signal), to thus cause the plunger 50*b* to move in a controllable manner through the portion 37*a* of the supply conduit 31 to controllably adjust the cross-sectional flow area A of the portion 37*a* and thus the hydrodynamic resistance of at least the portion 37*a*.

As shown in FIGS. 5A-7B, in some example embodiments, the supply conduit actuator 50 may be configured to move (e.g., extend), for example to move an end surface 52 of the plunger 50*b*, between separate positions L1 (also referred to herein as a rest position) and L2 (also referred to herein as an extended position) to adjust the cross-sectional flow area A between a rest area A1, that is associated with a reduced-magnitude hydrodynamic resistance HR1 of at least portion 37*a*, and a smaller jetting area A2, that is associated with an increased-magnitude hydrodynamic resistance HR2. It will be understood that the supply conduit actuator 50 may be in the rest position based on the end surface 52 being at the rest position L1 with reference to at least the bushing 25 and/or assembly housing 15, and the supply conduit actuator 50 may be in the extended position based on the end surface 52 being at the extended position L2 with reference to the bushing 25 and/or assembly housing 15. It will be understood that the supply conduit actuator 50 may be reversibly controlled (e.g., by the control device 1000) to cause the end surface 52 to move between separate, particular positions L1 and L2, to thus change the cross-sectional flow area A between separate, particular magnitudes of area and thus to change the hydrodynamic resistance HR of at least the portion 37*a* of the supply conduit 31 at different times in association with a jetting operation to controllably restrict or enable viscous medium flow through the supply conduit 31. Additionally, as described herein, the control device 1000 may adjust the positions L1 and/or L2 in relation to the bushing 25 and/or assembly housing 15, to thus adjust the cross-sectional flow areas A1 and/or A2 to thus adjust the hydrodynamic resistances HR1 and/or HR2, to thereby adjust one or more properties of the droplets 410 jetted during one or more jetting operations. Such adjustment may be based on processing sensor data generated by one or more sensor devices 60 of the jetting device 1.

Referring now to FIGS. 5A-5B, 6A-6B, 7A-7B, and 8, the supply conduit actuator 50 may be controlled to move separately from, and independently of, the impacting device 21 during a jetting operation, such that the hydrodynamic resistance of at least the portion 37*a* of the supply conduit 31 is caused to increase (e.g., from HR1 to HR2) independently of (e.g., prior to) the impacting device 21 being controlled to force one or more droplets 410 through the jetting nozzle 26, be maintained at the increased hydrodynamic resistance magnitude (e.g., HR2) concurrently with the impacting device 21 being controlled to force one or more droplets 410 through the jetting nozzle 26, and reduced back to a rest magnitude (e.g., HR1) subsequently to the impacting device 21 being controlled to stop the forcing of one or more droplets 410 through the nozzle 26.

FIGS. 5A and 5B show a rest state of the jetting device 1 that includes the supply conduit actuator 50 in a rest state ("rest position"), where the end surface 52 of the supply conduit actuator 50 is at a rest position L1 in relation to the bushing 25 and/or assembly housing 15. Referring now to FIG. 8 in view of FIGS. 5A and 5B, in a jetting operation that begins at time to, the impacting device 21 and the supply conduit actuator 50 may be in respective rest positions, such that the end surface 52 of the plunger 50*b* is at the rest position L1 in relation to the portion 37*a* of the supply conduit 31 and thus the portion 37*a* has a first cross-sectional flow area A=A1. In addition, in FIGS. 5A and 5B, the supply conduit 31 may be configured to enable, increase, or maximize viscous medium 490 flow through the supply conduit to the jetting chamber 24, for example to fill the jetting chamber 24 to replenish any viscous medium 490 lost from the jetting chamber in a previous jetting operation.

FIGS. 6A and 6B show a resistance state of the jetting device that includes the supply conduit actuator 50 in a resistance state ("resistance position"), where the end surface 52 of the supply conduit actuator 50 is moved from the rest position L1 to a lower, extended position L2 in relation to the bushing 25 and/or assembly housing 15, such that the cross-sectional flow area A of the portion 37*a* of the supply conduit 31 is reduced by the portion of the plunger 50*b* that at least partially occupies the first area A1 of the portion 37*a* to a smaller, second area A2. Based on the cross-sectional flow area A of the portion 37$a$ of the supply conduit 31 being reduced based on the movement of the supply conduit actuator 50, the hydrodynamic resistance of at least the portion 37$a$ of the supply conduit 31, for example hydrodynamic resistance to flow of the viscous medium 490 from and/or to the jetting chamber 24 via the supply conduit 31, may be increased (e.g., from HR1 to HR2), thereby at least restricting the flow of viscous medium 490 out of the jetting chamber 24 via the supply conduit 31.

In some example embodiments, including the example embodiments shown in FIGS. 6A-6B, the extended position of the supply conduit actuator where the end surface 52 is at the extended position L2 is a full extension (e.g., maximum extension) position of the supply conduit actuator 50, wherein the supply conduit actuator 50 is configured to move between the rest position (L1) and a full extension position (e.g., L2) and is not configured to be able to (e.g., cannot) move further through the portion 37$a$ to restrict the cross-sectional flow area to be smaller than the second area A2. In some example embodiments, the supply conduit actuator 50 is configured to extend to a full extension position (e.g., where the end surface 52 is at position L2) wherein the cross-sectional flow area A of the portion 37$a$ of the supply conduit 31 is not fully closed (e.g., A=A2 is not a zero value, or null size), even though the supply conduit actuator 50 is at a full extension. Restated, in some example embodiments, the supply conduit actuator 50 may be configured to, at a full extension of the supply conduit actuator 50, reduce the cross-sectional flow area A of the portion 37$a$ of the supply conduit 31 without closing the cross-sectional flow area A of the portion of the supply conduit 31. Accordingly, the cross-sectional flow area A may have at least a certain, non-zero minimum magnitude at any position that the supply conduit actuator 50 is configured to move to. Accordingly, the supply conduit actuator 50 may be configured to reduce or prevent total blocking of the flow of viscous medium 490 through the supply conduit 31, and thereby reducing or preventing the likelihood of formation of agglomeration and/or damaging of particles (e.g., solder balls) in the viscous medium 490 being damaged due to impact on the supply conduit actuator 50 and/or between the supply conduit actuator 50 and the inner surface 37$i$ of the supply conduit 31 and/or flow through an excessively constricted cross-sectional flow area A of the portion 37$a$ of the supply conduit 31.

In some example embodiments, the magnitude of the second area A2 may be between 0% and about 90% smaller than the magnitude of the first area A1. In some example embodiments, the magnitude of the second area A2 may be between 0% and about 80% smaller than the magnitude of the first area A1. In some example embodiments, the magnitude of the second area A2 may be between about 50% and about 90% smaller than the magnitude of the first area A1. In some example embodiments, the magnitude of the second area A2 may be between about 50% and about 80% smaller than the magnitude of the first area A1.

FIGS. 7A and 7B show the jetting device 1 that includes the supply conduit actuator 50 in the extended state (e.g., extended position) while the impacting device 21 is moved into a jetting state (e.g., jetting position), based on the impacting device 21 being moved through the piston bore 35 to reduce the volume of the jetting chamber 24 to thus force viscous medium 490 from the jetting chamber 24 and through the jetting nozzle 26 to form one or more droplets 410. As shown in FIGS. 7A-7B and in FIG. 8, the supply conduit actuator 50 may be maintained in the same extended state (e.g., extended position) while ("concurrently with") the impacting device 21 is moved between the rest state shown in FIGS. 6A-6B and the jetting state shown in FIGS. 7A-7B. Accordingly, as shown in FIGS. 6A-7B, the supply conduit actuator 50 may be moved between a rest state and an extended state separately from (e.g., independently of) the movement of the impacting device 21 to cause one or more droplets 410 to be jetted from through the jetting nozzle 26.

Figure 8:
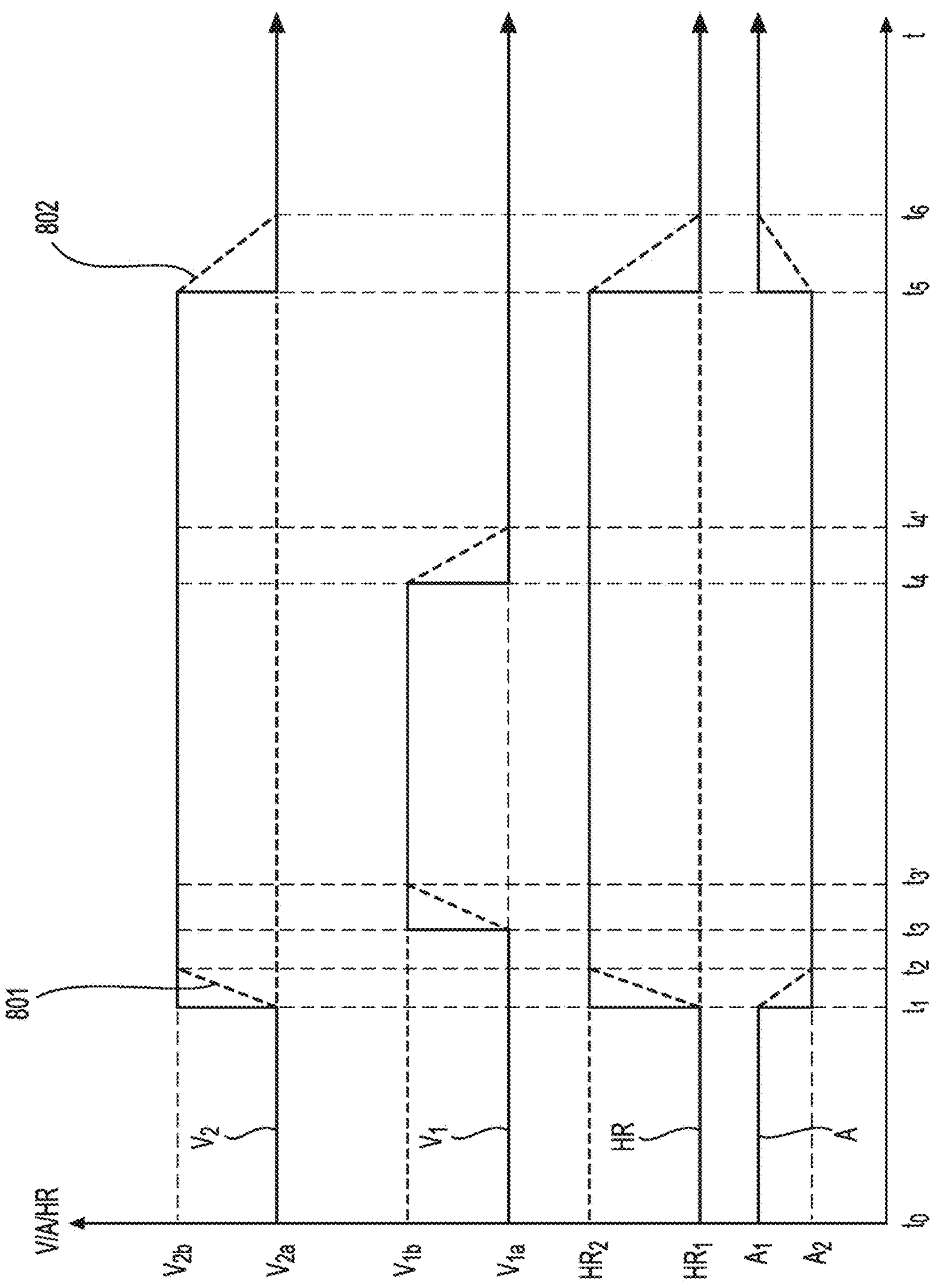
FIG. 8 is a timing chart illustrating variation of motion of the impacting device and supply conduit actuator during a jetting operation according to some example embodiments of the technology disclosed herein.

Referring now to FIG. 8 in reference to FIGS. 5A-7B, the supply conduit actuator 50 and impacting device 21 may be separately and independently controlled (e.g., by control device 1000 via separate control signals transmitted thereby to the supply conduit actuator 50 and impacting device 21) to control the hydrodynamic resistance of at least the portion 37$a$ of the supply conduit 31 in association with jetting one or more droplets 410 through the jetting nozzle 26, so that the hydrodynamic resistance is increased at least in advance of (e.g., prior to) and during the jetting so that backflow of viscous medium from the jetting chamber 24 and/or jetting nozzle 26 via the supply conduit 31 during the jetting of the one or more droplets 410 is reduced or prevented, and the hydrodynamic resistance is decreased after (e.g., subsequently to) the jetting so that flow of viscous medium 490 to the jetting chamber 24 (e.g., to replenish jetted viscous medium 490 in the jetting chamber 24) may be enabled, improved, increased, or the like.

As shown in FIG. 8 and FIGS. 5A-5B, a jetting operation may begin at a time to wherein the jetting device 1 is in a rest state (e.g., rest position, retracted state, retracted position, or the like), where the impacting device 21 is in a rest state based on the drive voltage V1 applied to the impacting device 21 (e.g., by the control device 1000) may be a first magnitude V1$a$ (which may be a zero value, low value, or the like) and where the supply conduit actuator 50 is also in a rest state (e.g., rest position, retracted state, retracted position, or the like) based on the drive voltage V2 (separate from drive voltage V1) applied to the supply conduit actuator 50 (e.g., by the control device 1000) may be a first magnitude V2$a$ (which may be a zero value, low value, or the like). As shown in FIG. 8 and FIGS. 5A-5B, based on the drive voltage V2 being at the first magnitude V2$a$, the supply conduit actuator 50 may be caused to be in a rest state (e.g., rest position, retracted state, retracted position, or the like) wherein the end surface 52 of the supply conduit actuator 50 is at a first position L1 (e.g., rest position) and thus the cross-sectional flow area A of the portion 37$a$ of the supply conduit 31 is a first area A1 and thus the hydrodynamic resistance of at least the portion 37$a$ of the supply conduit 31 to flow of the viscous medium to and/or from the jetting chamber 24 via the supply conduit 31 is at a first, lower magnitude HR1. The first magnitude HR1 of the hydrodynamic resistance may enable improved flow of viscous medium 490 through the supply conduit 31 to/from the jetting chamber 24.

As further shown in FIG. 8 and FIGS. 6A-6B, at time $t_o$, the drive voltage V2 applied to the supply conduit actuator 50 may be changed (e.g., by the control device 1000 based on executing a jetting program stored at a memory of the control device 1000) from a first drive voltage V2$a$ to a second drive voltage V2$b$ (e.g., a high voltage, an extension voltage, or the like) to cause the supply conduit actuator 50 to move from the rest position to an extended position (e.g., extended state) such that the end surface 52 of the supply conduit actuator 50 moves from the first position L1 to the second position L2, so as to at least partially restrict the cross-sectional flow area A of the portion 37$a$ of the supply conduit 31 from the first area A1 shown in FIG. 5B to the smaller, second area A2 shown in FIG. 6B. It will be understood that the first and second positions L1 and L2 may be referred to as first and second distances of the end surface 52 from an opposing inner surface 37*i* of the supply conduit 31. As shown in FIG. 8, the restriction of the cross-sectional area A of the portion 37*a* may result in the hydrodynamic resistance of at least the portion 37*a* to viscous medium 490 flow (e.g., backflow) to and/or from the jetting chamber 24 and via the supply conduit 31 being increased from the first magnitude HR1 to a greater, second magnitude HR2.

Still referring to FIG. 8, in some example embodiments, the drive voltage V2 may be adjusted from the first magnitude V2*a* to the second magnitude V2*b* in a step change, so as to cause the supply conduit actuator 50 to move rapidly from the rest position to the extended position in a step change at time $t_1$. In some example embodiments, the drive voltage V2 may be adjusted from the first to second magnitudes V2*a* to V2*b* in a gradual change 801 (e.g., continuously or in a series of smaller, incremental step changes) between time $t_1$ to time $t_2$, so as to cause the supply conduit actuator 50 to move gradually from the rest position to the extended position in a gradual change over time between time $t_1$ and $t_2$. Based on the supply conduit actuator 50 moving gradually between the rest position and extended position instead of in a step change, such that the cross-sectional flow area A changes gradually between time ti to time $t_2$, the risk of damage to particles in the viscous medium 490 and/or formation of agglomerations of particles in the viscous medium 490 may be reduced or prevented.

Still referring to FIG. 8 and as shown in FIGS. 6A-6B and 7A-7B, at time $t_3$, which is subsequent to time $t_1$ and time $t_2$, the drive voltage V1 applied to the impacting device 21 may be changed (e.g., by the control device 1000 based on executing a jetting program stored at a memory of the control device 1000) from a first drive voltage V1*a* to a second drive voltage V1*b* (e.g., a high voltage, a jetting voltage, or the like) to cause the impacting device 21 to move from the rest state to an extended state (e.g., extended position, jetting state, jetting position, etc.) such that the impact end surface 23 of the impacting device 21 moves through the piston bore 35 to reduce the volume of the jetting chamber 24, to increase the internal pressure of viscous medium 490 in the jetting chamber 24 and thus to force at least some viscous medium 490 through the jetting nozzle 26 to form one or more droplets 410. As shown in FIG. 8, the drive voltage V1 may be changed from the first drive voltage V1*a* to the second drive voltage V1*b* over a period of time (also referred to as a "rise time"), from time $t_3$ to time $t_{3'}$. The period of time from time $t_3$ to time $t_{3'}$ may be a period of time that is more than about 1 microseconds, but less than about 50 microseconds. But, example embodiments are not limited thereto, and in some example embodiments the period of time from time $t_3$ to time $t_{3'}$ may be less than 1 microsecond.

As shown in FIGS. 6B, 7B, and 8 the supply conduit actuator 50 may be caused (e.g., by the control device 1000) to increase the hydrodynamic resistance of the portion 37*a* of the supply conduit 31 from a first magnitude (HR1) to a second magnitude (e.g., HR2) at a time (e.g., $t_1$ to $t_2$) prior to beginning jetting of droplets at time $t_3$, and the impacting device 21 may, subsequently to the hydrodynamic resistance being increased to the second magnitude (HR2), be caused (e.g., by the control device 1000) to cause the one or more droplets 410 to be jetted, based on controlling the drive voltage V1 applied to the impacting device 21 from time $t_3$ to time $t_4$ while the hydrodynamic resistance is maintained at the second level (e.g., HR2). While FIG. 8 illustrates the drive voltage V1 being changed from V2*a* to V2*b* and back to V2*a* in a single cycle from time $t_3$ to time $t_4$, it will be understood that the jetting between time $t_3$ to time $t_4$, while the hydrodynamic resistance is maintained at HR2, may be a plurality of separate, distinct cyclings of the drive voltage V1 from V1*a* to V1*b* and back to V1*a* to cause multiple droplets 410 to be jetted from time $t_3$ to time $t_4$. Because the hydrodynamic resistance is maintained at the increased magnitude (HR2) based on the supply conduit actuator 50 being maintained at the extended position prior to and while the jetting is being performed by the impacting device 21 between $t_3$ to time $t_4$, backflow of viscous medium 490 during the jetting may be reduced or prevented. Additionally, one or more properties of the droplets 410 may be adjusted based on the hydrodynamic resistance being at the increased magnitude (HR2) as a result of the supply conduit actuator 50 being in the extended position.

Still referring to FIG. 8, the hydrodynamic resistance of the portion 37*a* of the supply conduit 31 may be maintained at the increased magnitude (HR2) subsequently to the jetting by the impacting device 21 being ended at time $t_4$, for example for the duration of a rest period from time $t_4$ to time $t_5$. At time $t_5$, upon the elapse of the rest period, the drive voltage V2 applied to the supply conduit actuator 50 may be changed, in a step change at time $t_5$ or gradually (e.g., continuously or in a series of smaller, incremental step changes) over a period of time from time $t_5$ to $t_6$, to the first magnitude V2*a* to cause the supply conduit actuator 50 to move to the rest position as shown in FIGS. 5A-5B so as to increase the cross-sectional flow area A of the portion 37*a* of the supply conduit 31 from the restricted second area A2 to the larger first area A1, thereby reducing the hydrodynamic resistance of at least the portion 37*a* of the supply conduit 31 from HR2 to HR1. As a result, the flow of viscous medium 490 through the supply conduit 31 to and/or from the jetting chamber 24 prior to a subsequent, separate jetting operation may be improved. As shown in FIG. 8, the drive voltage V1 may be changed from the second drive voltage V1*b* to the second drive voltage V1*a* over a period of time, from time $t_4$ to time $t_4'$. The rest period may being at time $t_{4'}$, when the drive voltage V1 reaches the magnitude V1*a*, instead of time $t_4$, when the drive voltage V1 begins to change from V1*b* to V1*a*. It may be understood that the hydrodynamic resistance of the portion 37*a* of the supply conduit 31 may be maintained at the increased magnitude (HR2) subsequently to the drive voltage reaching the magnitude of the second drive voltage V1*a*at time $t_{4'}$. The period of time from time $t_4$ to time $t_{4'}$ may be a period of time that is more than about 1 microseconds, but less than about 50 microseconds. But, example embodiments are not limited thereto, and in some example embodiments the period of time from time $t_4$ to time $t_{4'}$ may be less than 1 microsecond.

As shown generally in FIG. 8, the supply conduit actuator 50 may be controlled during a jetting operation to cause the hydrodynamic resistance of at least the portion 37*a* of the supply conduit 31 to be increased to an increased magnitude before and during the jetting of one or more droplets 410 via control of the impacting device 21, where said control of the supply conduit actuator 50 may be independent of the impacting device 21 and configured to enable the hydrodynamic resistance to be established at the greater magnitude (HR2) during the jetting of droplets (e.g., throughout the elapsed time period between time $t_3$ and $t_4$). By causing the hydrodynamic resistance to be adjusted prior to and subsequent to the operation of the impacting device 21 to jet one or more droplets 410, the likelihood of stability of the hydrodynamic resistance during the operation of the impacting device 21 to jet the one or more droplets (e.g., throughout the elapsed time period between time $t_3$ and $t_4$) may be improved, thereby improving the likelihood that the jetted droplets 410 will have more consistent and uniform values of one or more particular properties.

While the example embodiments shown in FIGS. 5A, 6A, 7A illustrate the impacting device 21 as including a plunger 21*b* having an impact end surface 23 that defines a portion of the jetting chamber 24, and that the plunger 21*b* moves through the piston bore 35 to reduce the volume of the jetting chamber 24, it will be understood that example embodiments of the jetting head assembly 5 are not limited thereto.

Figure 11:
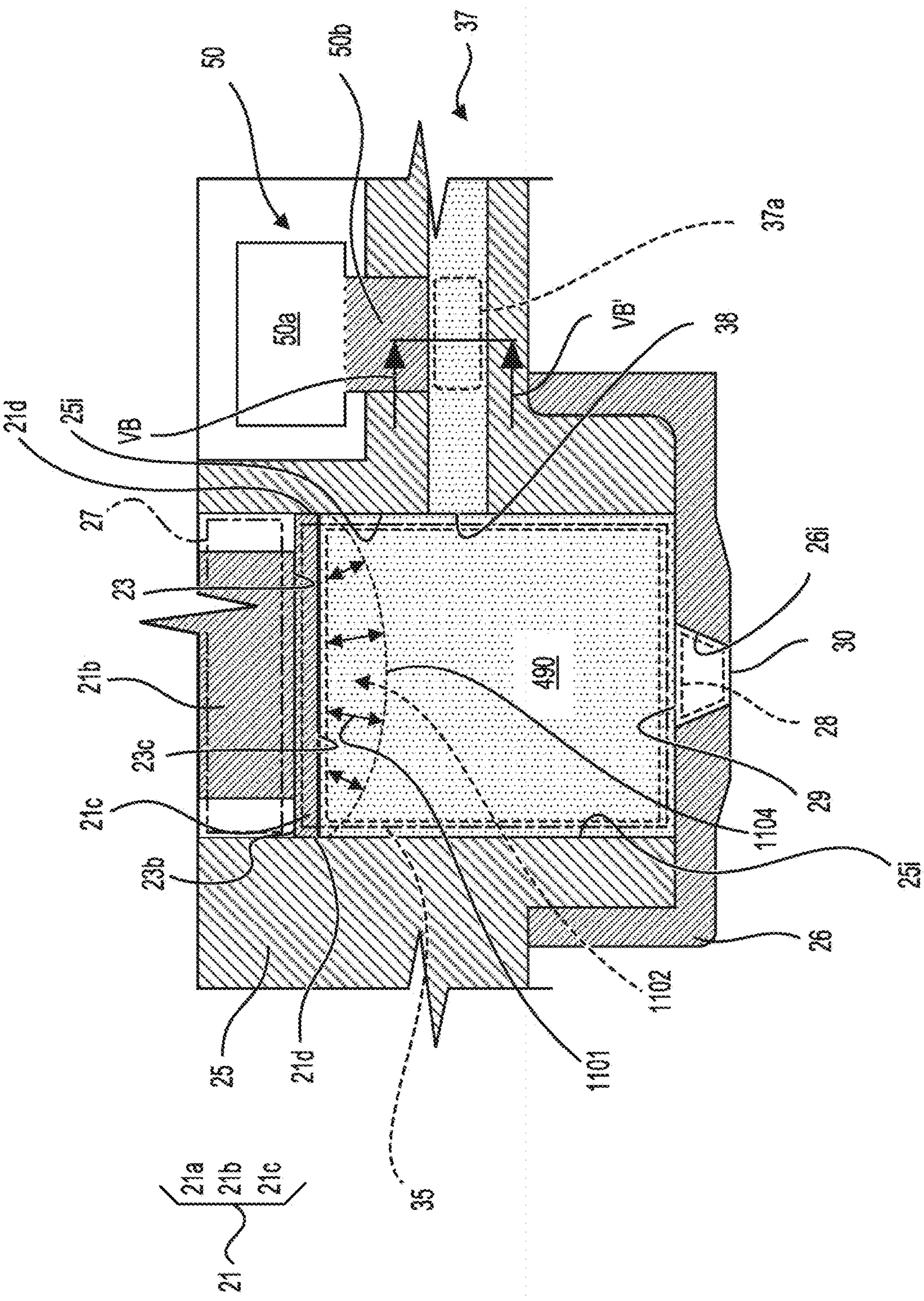
FIG. 11 is an expanded cross-sectional view of region A of the jetting device shown in FIG. 4, according to some example embodiments of the technology disclosed herein.

For example, FIG. 11 is an expanded cross-sectional view of region A of the jetting device shown in FIG. 4, according to some example embodiments of the technology disclosed herein, wherein the impacting device 21 includes at least an actuator part 21*a* and a plunger 21*b* as described herein with reference to FIGS. 4-8 and further includes a membrane 21*c* that includes a flexible material, where the membrane 21*c* includes an impact end surface 23*c* that defines the upper boundary of the jetting chamber 24, and the impact end surface 23 of the plunger 21*b* is in contact with an upper surface 23*b* of the membrane 21*c*, such that the plunger 21*b* is isolated from the jetting chamber 24 by the membrane 21*c*.

While FIG. 11 illustrates the impacting device 21 as including the plunger 21*b*, it will be understood that in some example embodiments the plunger 21*b* may be absent, such that the actuator part 21*a* is in direct contact with the upper surface 23*b* of the membrane 21*c* and the impact end surface 23 is a lower surface of the actuator part 21*a* that is in contact with the upper surface 23*b*, such that the actuator part 21*a* may act directly on the membrane 21*c*. As shown in FIG. 11, the portions of the impacting device 21 that include the actuator part 21*a* and may further include the plunger 21*b* are located within a separate space 27, isolated from the jetting chamber 24 by membrane 21*c*, where the separate space 27 is at least partially defined by one or more separate inner surfaces 25*i* of the bushing 25 and the upper surface 23*b* of the membrane 21*c*. As shown, the plunger 21*b* and/or actuator part 21*a* may have a smaller diameter than the diameter of the space 27, but example embodiments are not limited thereto. As further shown, the piston bore 35 may include at least the space, defined by the bushing inner surfaces 25*i*, in which at least the membrane 21*c* is located, and may further include the space 27 in which the plunger 21*b* and/or actuator part 21*a* are located, but example embodiments are not limited thereto.

The jetting head assembly 5 shown in FIG. 11 may operate similarly to the jetting head assembly shown in FIGS. 5A-7B, and as shown in FIG. 8, where the impacting device causes a volume of the jetting chamber 24 to be reduced to force one or more droplets 410 of the viscous medium 490 in the jetting chamber 24 through the conduit 28 of the jetting nozzle 26 to be jetted as the one or more droplets 410. Additionally, the supply conduit actuator 50 shown in FIG. 11 may be the same as the supply conduit actuator 50 shown and described in FIGS. 4-7B and may operate the same way as described with reference to any example embodiments herein.

As shown in FIG. 11, one or more surfaces 21*d* of the membrane 21*c* are fixed to one or more corresponding inner surfaces 25*i* of the bushing 25, via any well-known means for fixing a flexible material to a rigid material (e.g., clamping, adhesive, sintering, friction fit, or the like), such that said one or more surfaces 21*d* of the membrane 21*c* are held in place and do not move during a jetting operation.

During a jetting operation via the impacting device 21 shown in FIG. 11, at least the actuator part 21*a* may cause the impact end surface 23 contacting the upper surface 23*b* to move downwards, towards the jetting nozzle 26, thereby pushing the membrane 21*c* (which includes a flexible material) to be deformed 1101 (e.g., "pushed") downwards towards the jetting nozzle 26, such that the membrane 21*c* moves through a portion of space 1102 within the space defined by the one or more inner surfaces 25*i* of the bushing 25, so that the impact end surface 23*c* moves through the portion of space 1102 to a jetting position 1104 (e.g., extended position) such that the volume of the jetting chamber 24 is reduced by the volume of the portion of space 1102 through which the membrane 21*c* is deformed. As shown, the surfaces 21*d* of the membrane 21*c* may remain fixed to one or more inner surfaces 25*i* during the operation. As a result of the membrane 21*c* moving through the portion of space 1102 to reduce the volume of the jetting chamber 24, the impacting device may force one or more droplets of viscous medium 490 through the conduit 28 of the jetting nozzle 26 to be jetted as one or more droplets 410. The above-described deforming 1101 of the membrane 21*c*, based on at least the actuator part 21*a* causing impact end surface 23 to push downwards on the upper surface 23*b* of the membrane 21*c*, may be performed as part of the operation performed from time $t_3$ to time $t_{3'}$ in FIG. 8. The membrane 21*c* may be held in the deformed position (e.g., such that impact end surface 23*c* remains at position 1104) from time $t_{3'}$ to time $t_4$ as shown in FIG. 8, and the membrane 21*c* may be caused to relax to the initial position shown in FIG. 11, based on at least the actuator part 21*a* causing the impact end surface 23 to move upwards and away from the jetting nozzle 26 to release pressure exerted on the upper surface 23*b* of the membrane 21*c*, as part of the operation performed from time $t_4$ to time $t_4'$ in FIG. 8. As noted above, it will be understood that the supply conduit actuator 50 shown in FIG. 11 may operate in the same way as the supply conduit actuator 50 described with reference to FIGS. 5A-7B and FIG. 8.

Figure 9:
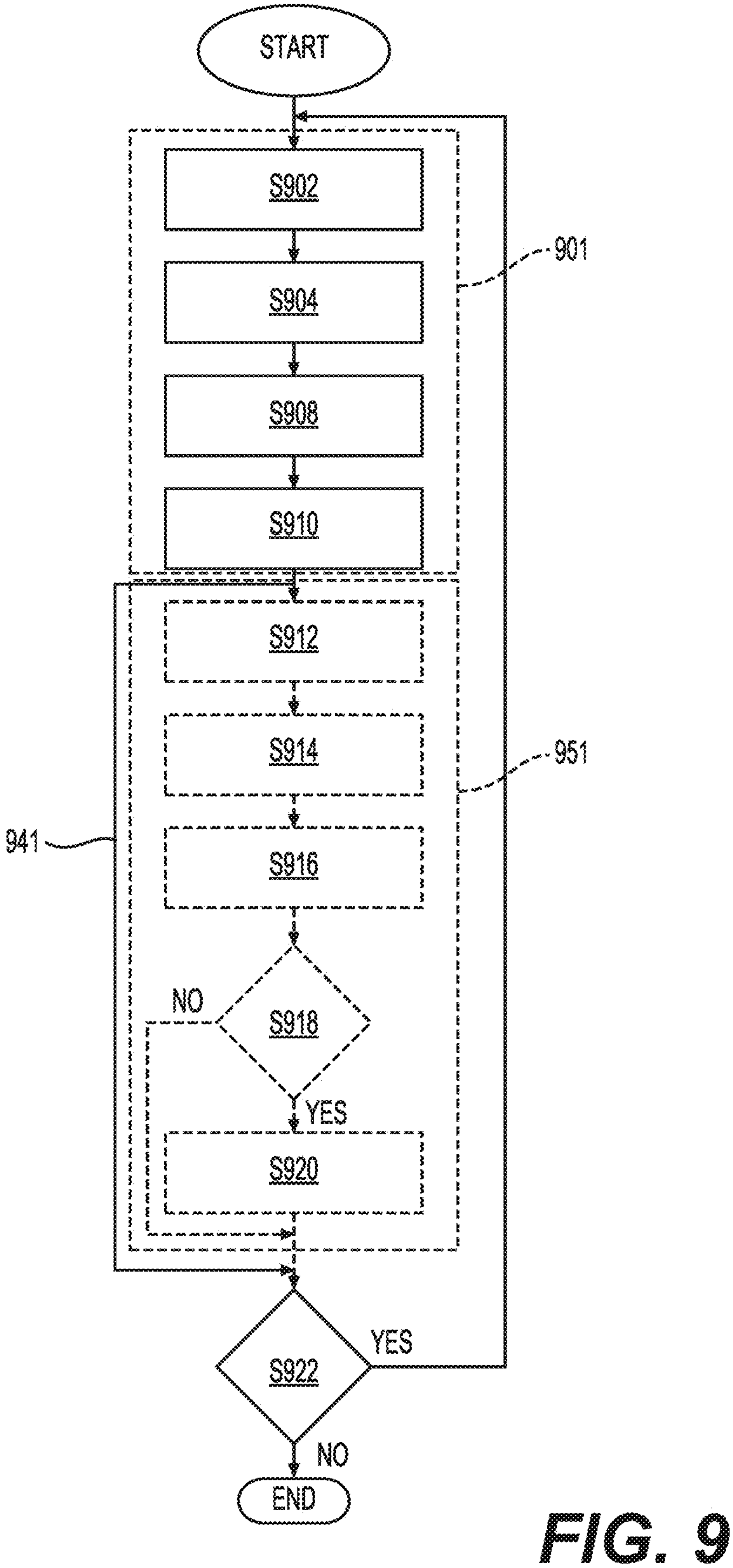
FIG. 9 is a flowchart illustrating a method of operating a jetting device to perform one or more jetting operations according to some example embodiments of the technology disclosed herein.

FIG. 9 is a flowchart illustrating a method of operating a jetting device to jet one or more droplets and to adjust a hydrodynamic resistance of at least a portion of the jetting device based on sensor data according to some example embodiments of the technology disclosed herein. The method shown in FIG. 9 may be implemented by a jetting device 1 that includes a supply conduit actuator 50 according to any of the example embodiments included herein. The method shown in FIG. 9 may be implemented by the control device 1000, for example based on the control device 1000 executing a program of instructions stored in a memory of the control device 1000. As shown, the method may include performing one or more jetting operations 901 one or iteratively.

At S902, the supply conduit actuator 50 may be controlled (e.g., by control device 1000, based on applying a particular drive voltage and/or control signal to the supply conduit actuator) to move from a rest position to an extended position (e.g., as shown in FIGS. 6A-6B and at time $t_1$ to time $t_2$ in FIG. 8) and thus move through the portion 37*a* of the supply conduit 31, so that the end surface 52 of the supply conduit actuator 50 moves from a particular rest position L1 to a particular extended position L2, to thereby reduce the cross-sectional flow area A of the portion 37*a* of the supply conduit 31 from a first area A1 to a second area A2 and thus to increase the hydrodynamic resistance of at least the portion 37*a* of the supply conduit 31 to viscous medium flow from the jetting chamber via the supply conduit 31. Such control of the supply conduit actuator 50 may be implemented independently of any control of the impacting device 21 of the jetting device 1 that may be controlled to cause viscous medium droplets 410 to be jetted via the jetting nozzle 26, such that the supply conduit actuator 50 is caused, at operation S902, to move independently of the impacting device 21. In some example embodiments, to move through the portion 37*a,* the end surface 52 may move through only a limited portion of portion 37*a,* such that the cross-sectional flow area A of the portion 37*a* is not closed and viscous medium 490 flow through the portion 37*a* is not completely blocked.

At S904, subsequently to S902 and thus while the hydrodynamic resistance of at least the portion 37*a* of the supply conduit 31 is maintained at an elevated level (e.g., magnitude) due to the movement of the supply conduit actuator 50 at S902, the impacting device 21 may be controlled (e.g., by control device 1000, based on applying a particular drive voltage and/or control signal to the impacting device 21) to move from a rest position to an extended position (e.g., as shown in FIGS. 7A-7B and at time $t_3$ to time $t_4$ and/or time $t_3$ to time $t_{4'}$ in FIG. 8), so that the impact end surface 23/23*c* of the impacting device 21 moves through the piston bore 35 to reduce the volume of the jetting chamber 24 and to thus force at least some of the viscous medium 490 in the jetting chamber and/or jetting nozzle 26 to move through the jetting nozzle 26 and through the outlet orifice 30 to form one or more droplets 410 of viscous medium. Said one or more droplets may break off from the remainder viscous medium 490 in the jetting device 1 and thus be jetted from the jetting nozzle 26 to a board 2 to form one or more deposits on a surface 2*a* of the board 2. Such control of the impacting device 21 may be implemented independently of any control of the supply conduit actuator 50, such that the impacting device 21 is caused, at operation S904, to move independently of the supply conduit actuator. The operation S904 may end with the impacting device 21 returning to a rest position (e.g., at time $t_4$'), such that the volume of the jetting chamber 24 is returned to a larger, rest volume and the jetting of one or more droplets 410 through the jetting nozzle 26 is ended.

At S908, concurrently with the end of operation S904 (e.g., the end of or upon an elapse of a rest time period after the end of operation S904, the supply conduit actuator 50 may be controlled (e.g., by control device 1000, based on applying a particular drive voltage and/or control signal to the supply conduit actuator) to move from the extended position back to the rest position (e.g., as shown in FIGS. 5A-5B and at time is to time $t_6$ in FIG. 8) and thus move through the portion 37*a* of the supply conduit 31, so that the end surface 52 of the supply conduit actuator 50 moves from a particular extended position L2 back to the particular rest position L1, to thereby increase the cross-sectional flow area A of the portion 37*a* of the supply conduit 31 from the second area A2 to the first area A1 and thus to reduce the hydrodynamic resistance of at least the portion 37*a* of the supply conduit 31 to viscous medium flow from the jetting chamber via the supply conduit 31, thereby enabling improved viscous medium 490 flow through the supply conduit 31.

At S910, concurrently with the end of operation S908 or upon an elapse of a time period after the end of operation S908, the viscous medium supply 430 may be controlled (e.g., by control device 1000) to induce a flow of viscous medium through the supply conduit 31, and thus via the portion 37*a* of the supply conduit 31, to the jetting chamber 24 to replenish viscous medium 490 that is jetted through the jetting nozzle 26 at operation S904. Because the hydrodynamic resistance of at least the portion 37*a* is reduced at operation S908, the enabled flow of viscous medium 490 through the supply conduit 31 is greater than if the supply conduit actuator 50 were in the extended position.

At S922, a determination is made (e.g., based on the jetting program being executed by the control device 1000) of whether additional jetting operations 901 are to be performed. If so, as shown in FIG. 9, the method returns to operation S902, and the supply conduit actuator 50 is controlled to return to the extended position in preparation for a subsequent jetting of one or more droplets 410. If not, the operation ends.

Still referring to FIG. 9, a feedback operation 951 may be performed concurrently with a jetting operation 901, subsequent to a jetting operation 901, and/or between successive jetting operations 901. FIG. 9 shows example embodiments where the feedback operation 951 is performed subsequently to the jetting operation 901 and/or between successive jetting operations 901, but it will be understood that example embodiments are not limited thereto, and one or more operations of the feedback operation 951 may be implemented at the same time as at least some of a jetting operation 901, including being implemented concurrently with one or more operations of the jetting operation 901 and/or between two or more successive operations of the jetting operation.

As shown in FIG. 9, the feedback operation 951 may be an optional operation that may be omitted from the method performed in FIG. 9, such that only jetting operations 901 are performed, but example embodiments are not limited thereto, and in some example embodiments both at least one jetting operation 901 and at least one feedback operation 951 may be performed during the performing of the method shown in FIG. 9. As further shown in FIG. 9, multiple iterations of the method, via operation S922, may result in multiple performances of both the jetting operation 901 and the feedback operation 951.

Referring now to the feedback operation 951, at S912 a sensor device 60 of the jetting device may generate sensor data based on monitoring, via a sensor field 62, one or more droplets 410 jetted during the jetting operation 901 (e.g., at operation S904). The sensor device 60 may be configured to generate sensor data that includes a captured image of a droplet 410 passing through a sensor field 62, information indicating a reflection of one or more beams of light (e.g., one or more beams of light emitted by a light emitter of the sensor device 60 and reflected back thereto to a light sensor of the sensor device 60) from a droplet 410 in sensor field 62, any combination thereof, or the like. The sensor data may be transmitted to control device 1000 and/or a separate computing device that may be external to the jetting device 1.

At S914, the sensor data may be received from the sensor device 60 and processed (e.g., at the control device 1000) to determine a value (e.g., magnitude) of one or more properties of the droplet 410 monitored by the sensor device 60 and represented via the sensor data. In some example embodiments, said sensor data may, when processed (e.g., by the control device 1000), indicate a value of one or more properties of the one or more jetted droplets 410, including a value for one or more of droplet 410 volume, droplet 410 shape, droplet 410 diameter, droplet 410 velocity, any combination thereof, or the like. Accordingly, the sensor data may be processed to determine a value of one or more properties of a jetted droplet 410.

At S916, the value of the one or more properties that is determined at S914 may be compared with a target value of the one or more properties, and a difference between the values may be determined. For example, where a value determined at S914 based on processing sensor data is a volume of a jetted droplet 410, at S916 the determined volume may be compared with a target droplet volume value and the difference therebetween may be determined (e.g., via subtraction). The comparison at S916 may be implemented for multiple properties that may be determined in parallel at S914. The target values of the one or more properties may be stored in a memory (e.g., a memory of the control device 1000 and/or a memory that is external to the jetting device 1) and may be accessed as part of performing operation S916.

At S918, a determination may be made regarding whether the determined difference between the determined and target values of one or more properties of a sensed jetted droplet 410 at least meets a threshold value. The threshold values associated with value differences for one or more properties may be stored in a memory (e.g., a memory of the control device 1000 and/or a memory that is external to the jetting device 1) and may be accessed as part of performing operation S918. If not (e.g., S918=NO), the feedback operation S951 may end, as shown in FIG. 9. The determination at S918 may include making multiple determinations in parallel with regard to multiple separate property values determined at S914 and compared with corresponding target values at S916. In some example embodiments, the determination at S918 may include determining if the threshold difference value is at least met for at least a majority of the properties for which difference values are determined at S916, such that a "YES" determination at S918 may be reached in response to determination that the difference threshold is at least reached for at least a majority of the properties, and/or one or more particular properties of the multiple properties, for which difference values are determined at S916.

If S918=YES (e.g., a value of a difference between a determined value of one or more properties and a corresponding target value of the one or more properties at least meets a particular threshold value), at S920, a determination is made of a new hydrodynamic resistance (e.g., HR2') and/or extended position (e.g., L2') that is to be achieved and maintained with regard to operation of the supply conduit actuator 50 during a subsequent jetting operation 901. Operation S920 may include accessing a database (e.g., a look-up table) to determine a value of a new extended position of the supply conduit actuator 50 (e.g., a new extended position L2') during the jetting operation (e.g., between operations S902 and S908). The database may be a look-up table that associates particular incremental changes in one or more particular properties of a droplet 410 with a corresponding change in the value/magnitude of the elevated level of hydrodynamic resistance (e.g., HR2) that is caused due to motion of the supply conduit actuator 50 during a jetting operation 901, and the change in magnitude of the hydrodynamic resistance may be separately applied to a stored association of hydrodynamic resistance change with supply conduit actuator 50 position change to determine the new extended position of the supply conduit actuator 50. The database may be a look-up table that associates particular incremental changes in one or more particular properties of a droplet 410 with a corresponding change in the extended position of the supply conduit actuator 50 (e.g., the position L2) that causes hydrodynamic resistance to be increased during a jetting operation 901. As described herein, a database such as a look-up table that associates magnitudes of change of one or more particular properties of a droplet 410 with a corresponding change in the extended position (e.g., L2) of the supply conduit actuator 50 and/or a corresponding change in the elevated hydrodynamic resistance HR2 to be caused by the movement of the supply conduit actuator 50 to the extended position may be assembled via well-known empirical methods of implementing said changes in hydrodynamic resistance and/or extended position of the supply conduit actuator 50 and determining corresponding changes in one or more properties of the jetted droplet 410.

Operation S920 may include accessing the database to determine a change in the elevated position of the supply conduit actuator 50 that is indicated by the database to correspond to all or a particular proportion (e.g., 50%) of the value (e.g., magnitude and direction) of the determined difference (determined at S916) between the target and determined values of one or more properties. The jetting program implemented in a subsequent jetting operation 901 may be modified to cause the supply conduit actuator 50 to move from the rest position (e.g., L1) to a new extended position (e.g., L2' that is different from L2), where the new extended position is based on applying the determined change in extended position to the initial extended position (e.g., L2) of the supply conduit actuator 50 during a previous jetting operation 901. Accordingly, in a subsequent jetting operation 901 that is implemented subsequent to operation S920, at operation S902, the supply conduit actuator 50 may be caused to move from the rest position (e.g., L1) to the new extended position (e.g., L2') to adjust the hydrodynamic resistance of at least the portion 37*a* of the supply conduit 31 to a new elevated level (e.g., HR2') so that one or more properties of a droplet 410 jetted at S904 a based on the jetting of a droplet 410 may be adjusted to approach and/or match the corresponding target values of the one or more properties that are accessed at S916.

In some example embodiments, the feedback operation 951 may be performed in entirety concurrently with the jetting at S904, between successive movements of the impacting device 21 and thus between successive droplet 410 jettings, such that the supply conduit actuator 50 may be controlled to move directly from the initial extended position (e.g., L2) implemented at S902 to a new extended position (e.g., L2') during the jetting at S904 without waiting for the end of the jetting at S904 to make the adjustment.

It will be understood that the feedback operation 951 may be implemented as part of an optimization to adjust the elevated hydrodynamic resistance (e.g., HR2) that is implemented by the supply conduit actuator 50 during a jetting operation 901 so that the values of one or more properties of the jetted droplets 410 are caused to approach and/or match corresponding target values, so as to cause the jetting device 1 to jet droplets 410 having more uniform and/or desired properties.

FIG. 9 illustrates a bypass 941 of the feedback operation 951 if the feedback operation is not to be performed, subsequently to or concurrently with the jetting operation 901. In some example embodiments, where the feedback operation 951 is performed subsequently to or concurrently with the jetting operation 901, the bypass 941 may be omitted.

Figure 10:
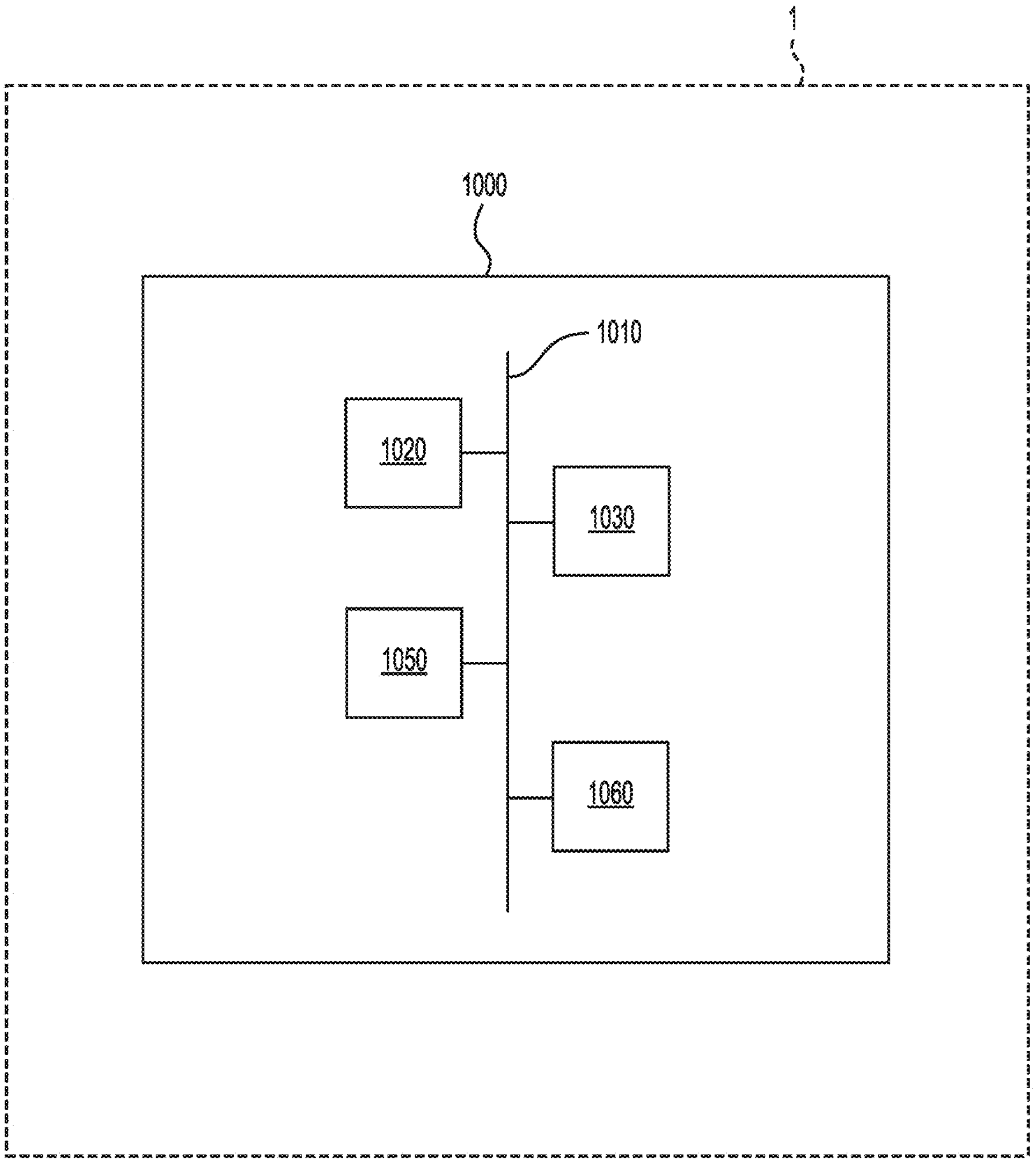
FIG. 10 is a schematic diagram illustrating a jetting device that includes a control device according to some example embodiments of the technology disclosed herein.

FIG. 10 is a schematic diagram illustrating a jetting device 1 that includes a control device 1000 according to some example embodiments of the technology disclosed herein.

The jetting device 1 shown in FIG. 10 may be a jetting device 1 according to any of the example embodiments illustrated and described herein, including any one of the jetting devices 1 and/or jetting head assemblies 5 illustrated in FIGS. 1-4, FIGS. 5A-5B, FIGS. 6A-6B, FIGS. 7A-7B, and FIG. 11, and the control device 1000 may be configured to implement any of the operations of the jetting device 1 according to any example embodiments included herein, including the operations as shown in FIGS. 8-9.

In some example embodiments, including the example embodiments shown in FIG. 10, the control device 1000 may be included in a jetting device 1. In some example embodiments, the control device 1000 may include one or more computing devices. A computing device may include a personal computer (PC), a tablet computer, a laptop computer, a netbook, some combination thereof, or the like.

In some example embodiments, including the example embodiments shown in FIG. 10, the control device 1000 may be included in, may include, and/or may be implemented by, one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device (e.g., a memory), for example a solid state drive (SSD), storing a program of instructions, and a processor configured to execute the program of instructions to implement the functionality of the control device 1000 according to any of the example embodiments herein, and thus to implement one or more jetting operations of the jetting device 1 according to any example embodiments as described herein.

Referring to FIG. 10, the control device 1000 may include a memory 1020, a processor 1030, a communication interface 1050, and a control interface 1060. The memory 1020, the processor 1030, the communication interface 1050, and the control interface 1060 may communicate with one another through a bus 1010.

The communication interface 1050 may communicate data from an external device using various network communication protocols. For example, the communication interface 1050 may communicate sensor data generated by a sensor (not illustrated) of the control device 1000 to an external device. The external device may include, for example, an image providing server, a display device, a mobile device such as, a mobile phone, a smartphone, a personal digital assistant (PDA), a tablet computer, and a laptop computer, a computing device such as a personal computer (PC), a tablet PC, and a netbook, an image outputting device such as a TV and a smart TV, and an image capturing device such as a camera and a camcorder.

The processor 1030 may execute a program of instructions and control the control device 1000. The processor 1030 may execute a program of instructions to control one or more portions of the jetting device 1 via generating and/or transmitting control signals to one or more elements of the jetting device 1 according to any of the example embodiments, including one or more jetting operations to cause one or more droplets of viscous medium to be jetted (e.g., to a board 2), via one or more control interfaces 1060. A program of instructions to be executed by the processor 1030 may be stored in the memory 1020.

The memory 1020 may store information. The memory 1020 may be a volatile or a nonvolatile memory. The memory 1020 may be a non-transitory computer readable storage medium. The memory may store computer-readable instructions that, when executed by at least the processor 1030, cause the at least the processor 1030 to execute one or more methods, functions, processes, etc. as described herein. In some example embodiments, the processor 1030 may execute one or more of the computer-readable instructions stored at the memory 1020.

In some example embodiments, the control device 1000 may transmit control signals to one or more of the elements of the jetting device 1 to execute and/or control a jetting operation whereby one or more droplets are jetted (e.g., to a board 2). For example, the control device 1000 may transmit one or more sets of control signals to one or more flow generators, actuators, control valves, some combination thereof, or the like, according to one or more programs of instruction. Such programs of instruction, when implemented by the control device 1000 may result in the control device 1000 generating and/or transmitting control signals to one or more elements of the jetting device 1 to cause the jetting device 1 to perform one or more jetting operations.

In some example embodiments, the control device 1000 may generate and/or transmit one or more sets of control signals according to any of the timing charts illustrated and described herein, including the timing chart illustrated in FIG. 8. In some example embodiments, the processor 1030 may execute one or more programs of instruction stored at the memory 1020 to cause the processor 1030 to generate and/or transmit one or more sets of control signals according to the timing chart illustrated in FIG. 8.

In some example embodiments, the communication interface 1050 may include a user interface, including one or more of a display panel, a touchscreen interface, a tactile (e.g., "button," "keypad," "keyboard," "mouse," "cursor," etc.) interface, some combination thereof, or the like. Information may be provided to the control device 1000 via the communication interface 1050 and stored in the memory 1020. Such information may include information associated with the board 2, information associated with the viscous medium to be jetted to the board 2, information associated with one or more droplets of the viscous medium, some combination thereof, or the like. For example, such information may include information indicating one or more properties associated with the viscous medium, one or more properties (e.g., size) associated with one or more droplets to be jetted to the board 2, some combination thereof, or the like.

In some example embodiments, the communication interface 850 may include a USB and/or HDMI interface. In some example embodiments, the communication interface 1050 may include a wireless network communication interface.

The foregoing description has been provided for purposes of illustration and description. It is not intended to be exhaustive. Individual elements or features of a particular example embodiment are generally not limited to that particular example, but are interchangeable where applicable and can be used in a selected embodiment, even if not specifically shown or described. The same may also be varied in many ways. Such variations are not to be regarded as a departure from example embodiments, and all such modifications are intended to be included within the scope of the example embodiments described herein.

The invention claimed is:

1. A device configured to jet one or more droplets of a viscous medium, the device comprising:
a jetting chamber configured to hold the viscous medium;
a supply conduit in fluid communication with the jetting chamber, the supply conduit configured to supply the viscous medium into the jetting chamber;
a jetting nozzle in fluid communication with the jetting chamber;
an impacting device at least partially defining the jetting chamber, the impacting device configured to cause an increase of internal pressure of the viscous medium in the jetting chamber by moving through at least a portion of the jetting chamber to reduce a volume of the jetting chamber, to force the one or more droplets of the viscous medium through the jetting nozzle to be jetted as the one or more droplets;
a supply conduit actuator configured to adjust a hydrodynamic resistance of at least a portion of the supply conduit to viscous medium flow from the jetting chamber via the supply conduit, based on moving through the portion of the supply conduit, independently of the impacting device, to adjust a cross-sectional flow area of the portion of the supply conduit, without closing the cross-sectional flow area of the portion of the supply conduit; and
a control device configured to control the supply conduit actuator and the impacting device to control the hydrodynamic resistance of at least the portion of the supply conduit in association with jetting the one or more droplets, such that:
the hydrodynamic resistance is increased, based on reducing the cross-sectional flow area of the portion of the supply conduit from a first area to a second area, at least in advance of and during jetting the one or more droplets, and
the hydrodynamic resistance is decreased, based on increasing the cross-sectional flow area of the portion of the supply conduit from the second area after jetting the one or more droplets,
wherein each of the first area and the second area has a respective non-zero magnitude.

2. The device of claim 1, wherein the impacting device includes a piezoelectric actuator.

3. The device of claim 1, wherein the supply conduit actuator includes a piezoelectric actuator.

4. The device of claim 1, wherein the supply conduit actuator is coupled to the supply conduit at an outlet orifice of the supply conduit that is in one or more inner surfaces of a housing that at least partially define the jetting chamber.

5. The device of claim 1, further comprising:
a sensor device configured to monitor the one or more droplets and generate sensor data based on the monitoring, such that the sensor data indicates a value of one or more properties of the one or more droplets;
wherein the control device is configured to
receive and process the sensor data to determine the value of the one or more properties of the one or more droplets, and
adjustably control the hydrodynamic resistance of the portion of the supply conduit, via adjustably controlling movement of the supply conduit actuator, based on the value of the one or more properties.

6. The device of claim 5, wherein the control device is configured to:
determine a difference between the value of the one or more properties and a corresponding target value of the one or more properties, and
control the hydrodynamic resistance of the portion of the supply conduit to a new hydrodynamic resistance, via adjustably controlling the movement of the supply conduit actuator, in response to determining that the difference at least meets a threshold value.

7. The device of claim 5, wherein the one or more properties of the one or more droplets include at least one of:
a velocity of the one or more droplets,
a diameter of the one or more droplets, or
a volume of the one or more droplets.

8. The device of claim 5, wherein the control device is configured to control the impacting device and the supply conduit actuator to
cause the supply conduit actuator to increase the hydrodynamic resistance of the portion of the supply conduit from a first magnitude to a second magnitude, and subsequently cause the impacting device to cause the one or more droplets to be jetted while the hydrodynamic resistance is maintained at the second magnitude.

9. The device of claim 8, wherein the control device is configured to control the impacting device and the supply conduit actuator to
cause the supply conduit actuator to reduce the hydrodynamic resistance of the portion of the supply conduit from the second magnitude to the first magnitude, upon an elapse of a rest period subsequently to the one or more droplets being jetted.

10. A method of controlling a device configured to jet one or more droplets of viscous medium onto a substrate, the device including a jetting chamber configured to hold the viscous medium, a supply conduit in fluid communication with the jetting chamber, the supply conduit configured to supply the viscous medium into the jetting chamber, a jetting nozzle in fluid communication with the jetting chamber, an impacting device at least partially defining the jetting chamber, the impacting device configured to cause an increase of internal pressure of the viscous medium in the jetting chamber by moving through at least a portion of the jetting chamber to reduce a volume of the jetting chamber, to force the one or more droplets of the viscous medium through the jetting nozzle to be jetted as the one or more droplets, and a supply conduit actuator configured to move through a portion of the supply conduit, independently of the impacting device, to adjust a cross-sectional flow area of the portion of the supply conduit without closing the cross-sectional flow area, to adjust a hydrodynamic resistance of at least the portion of the supply conduit to viscous medium flow from the jetting chamber via the supply conduit, the method comprising:
controlling the supply conduit actuator to increase the hydrodynamic resistance to an increased hydrodynamic resistance based on reducing the cross-sectional flow area of the portion of the supply conduit from a first area to a second area;
controlling the impacting device to jet the one or more droplets while maintaining the increased hydrodynamic resistance based on maintaining the cross-sectional flow area of the portion of the supply conduit at the second area; and
after jetting the one or more droplets, controlling the supply conduit actuator to decrease the hydrodynamic resistance, based on increasing the cross-sectional flow area of the portion of the supply conduit from the second area, wherein each of the first area and the second area has a respective non-zero magnitude.

11. The method of claim 10, further comprising:

processing sensor data received from a sensor device, the sensor data generated based on the sensor device monitoring the one or more droplets, to determine a value of one or more properties of the one or more droplets, and adjustably controlling the hydrodynamic resistance of the portion of the supply conduit, via adjustably controlling movement of the supply conduit actuator, based on the value of the one or more properties.

12. The method of claim 11 wherein the adjustably controlling includes determining a difference between the value of the one or more properties and a corresponding target value of the one or more properties, and controlling the hydrodynamic resistance of the portion of the supply conduit to a new hydrodynamic resistance, via adjustably controlling the movement of the supply conduit actuator, in response to determining that the difference at least meets a threshold value.

13. The method of claim 11, wherein the one or more properties of the one or more droplets include at least one of:

a velocity of the one or more droplets, a diameter of the one or more droplets, or a volume of the one or more droplets.

14. The method of claim 11, wherein:

the controlling the supply conduit actuator causes the supply conduit actuator to increase the hydrodynamic resistance of the portion of the supply conduit from a first magnitude to a second magnitude, and the method further includes subsequently causing the impacting device to cause the one or more droplets to be jetted while the hydrodynamic resistance is maintained at the second magnitude.

15. The method of claim 14, further comprising:

causing the supply conduit actuator to reduce the hydrodynamic resistance of the portion of the supply conduit from the second magnitude to the first magnitude, upon an elapse of a rest period subsequently to the one or more droplets being jetted.

16. The method of claim 10, wherein the impacting device includes a piezoelectric actuator.

17. The method of claim 10, wherein the supply conduit actuator includes a piezoelectric actuator.

* * * * *